United States Patent [19]
Grimes et al.

[11] Patent Number: 5,859,414
[45] Date of Patent: *Jan. 12, 1999

[54] INTERACTIVE CUSTOMER INFORMATION TERMINAL

[75] Inventors: Douglas Michael Grimes, Wellesley, Mass.; Nainesh P. Shah, Westlake, Ohio

[73] Assignee: Aironet Wireless Communications, Inc., Fairlawn, Ohio

[ * ] Notice: This patent issued on a continued prosecution application filed under 37 CFR 1.53(d), and is subject to the twenty year patent term provisions of 35 U.S.C. 154(a)(2).

[21] Appl. No.: 580,666

[22] Filed: Dec. 29, 1995

[51] Int. Cl.⁶ .......................... G06K 15/00; G06K 7/10; H04Q 9/00
[52] U.S. Cl. .......................... 235/383; 235/375; 235/462; 235/494; 340/825.35
[58] Field of Search ...................................... 235/383, 381, 235/472, 462; 364/400; 340/825.35, 825.33, 825.17

[56] References Cited

U.S. PATENT DOCUMENTS

| | | | |
|---|---|---|---|
| 3,836,755 | 9/1974 | Ehrat | 235/383 |
| 4,323,773 | 4/1982 | Carpenter . | |
| 4,345,315 | 8/1982 | Cadotte et al. . | |
| 4,415,065 | 11/1983 | Sandstedt . | |
| 4,703,423 | 10/1987 | Bado et al. | 364/400 |
| 4,727,245 | 2/1988 | Dobbins et al. . | |
| 4,750,151 | 6/1988 | Baus | 340/825.35 |
| 4,766,295 | 8/1988 | Davis et al. . | |
| 5,012,349 | 4/1991 | de Fay . | |
| 5,013,387 | 5/1991 | Goodwin et al. . | |
| 5,024,541 | 6/1991 | Tsukada et al. . | |
| 5,047,614 | 9/1991 | Bianco | 235/385 |
| 5,189,291 | 2/1993 | Siemiatkowski | 235/383 |
| 5,227,617 | 7/1993 | Christopher et al. . | |
| 5,250,789 | 10/1993 | Johnsen | 235/383 |
| 5,278,396 | 1/1994 | McGaha . | |
| 5,285,383 | 2/1994 | Lindsey et al. | 364/408 |
| 5,288,980 | 2/1994 | Patel et al. | 235/381 |
| 5,294,782 | 3/1994 | Kumar . | |
| 5,295,064 | 3/1994 | Malec et al. | 340/825.35 |
| 5,331,580 | 7/1994 | Miller et al. . | |
| 5,361,871 | 11/1994 | Gupta et al. | 235/383 |
| 5,386,106 | 1/1995 | Kumar . | |
| 5,406,271 | 4/1995 | Sonnendorfer et al. | 340/825.35 |
| 5,408,078 | 4/1995 | Campo et al. . | |
| 5,414,251 | 5/1995 | Durbin . | |

(List continued on next page.)

*Primary Examiner*—Donald T. Hajec
*Assistant Examiner*—Douglas X. Rodriguez
*Attorney, Agent, or Firm*—Renner, Otto, Boisselle & Sklar, P.L.L.

[57] ABSTRACT

A customer information terminal for use in a retail grocery store includes a housing defining an interior region, electronic circuitry including a microprocessor supported within the housing interior region, and a display screen supported by the housing and electrically coupled to the electronic circuitry. The customer information terminal further includes a dataform reader module supported by the housing and electrically coupled to the electronic circuitry for reading a dataform having encoded data relating to at least one of the following; an item offered for sale in the retail grocery store, a coupon for an item offered for sale in the retail grocery store, a customer identification number of a customer of the retail grocery store, and a recipe utilizing one or more items offered for sale in the retail grocery store. Also provided is a radio module supported by the housing and including a transmitter system and a receiver system electrically coupled to the electronic circuitry for transmitting at least a portion of decoded data from the read dataform to a remote device and receiving from the remote device additional data related to the decoded data wherein at least a portion of the additional data is displayed on the display screen. The CI terminal further includes a user interface module supported by the housing for inputting a command whereby the radio module is utilized to obtain supplemental data from the remote device, the supplemental data relating to at least one of the decoded data and the additional data and wherein at least a portion of the supplemental data is displayed on the display screen. A method for using the CI terminal of the present invention is also disclosed.

22 Claims, 14 Drawing Sheets

U.S. PATENT DOCUMENTS

| | | | |
|---|---|---|---|
| 5,424,524 | 6/1995 | Ruppert et al. | 235/462 |
| 5,426,423 | 6/1995 | Raimbault et al. | 340/825.35 |
| 5,448,046 | 9/1995 | Swartz | 235/432 |
| 5,468,942 | 11/1995 | Oosterveen et al. | 235/383 |
| 5,478,989 | 12/1995 | Shepley | 235/375 |
| 5,484,991 | 1/1996 | Sherman et al. | 235/383 |
| 5,493,107 | 2/1996 | Gupta et al. | 235/383 |
| 5,534,684 | 7/1996 | Danielson | 235/462 |
| 5,595,264 | 1/1997 | Trotta, Jr. | 235/383 |
| 5,630,071 | 5/1997 | Sakai et al. | 395/221 |
| 5,655,219 | 8/1997 | Jusa et al. | 370/383 |
| 5,665,951 | 9/1997 | Newman et al. | 235/380 |
| 5,668,803 | 9/1997 | Tymes et al. | 370/312 |
| 5,697,061 | 12/1997 | Krueger et al. | 235/383 |

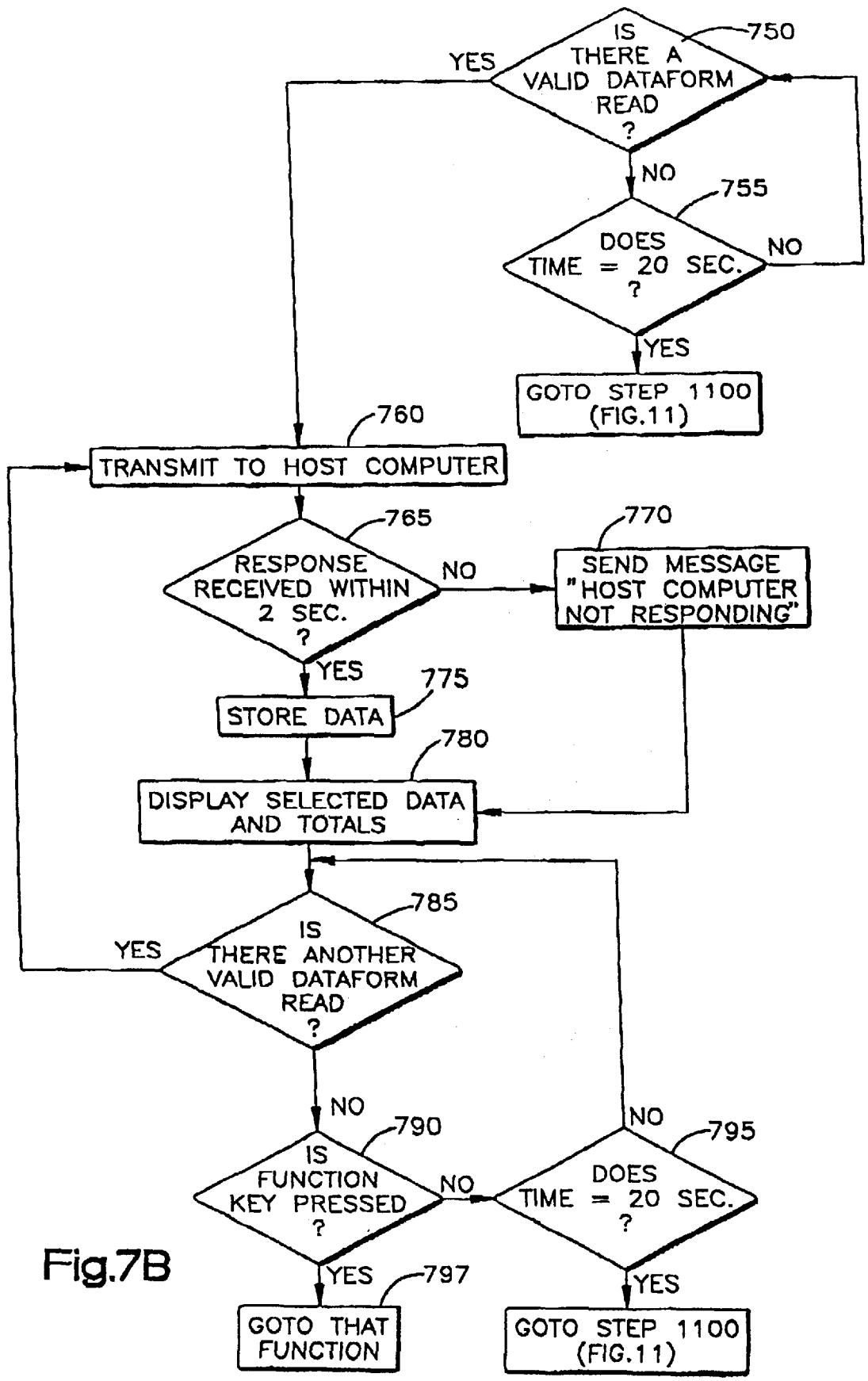

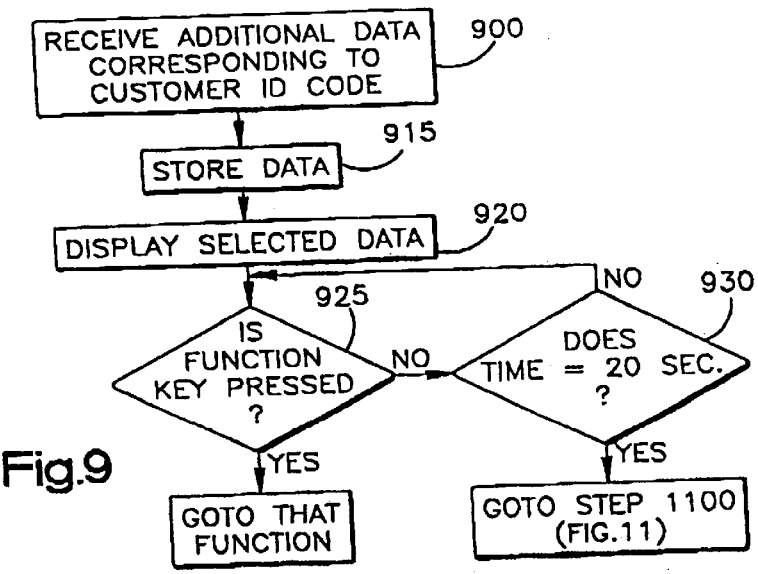
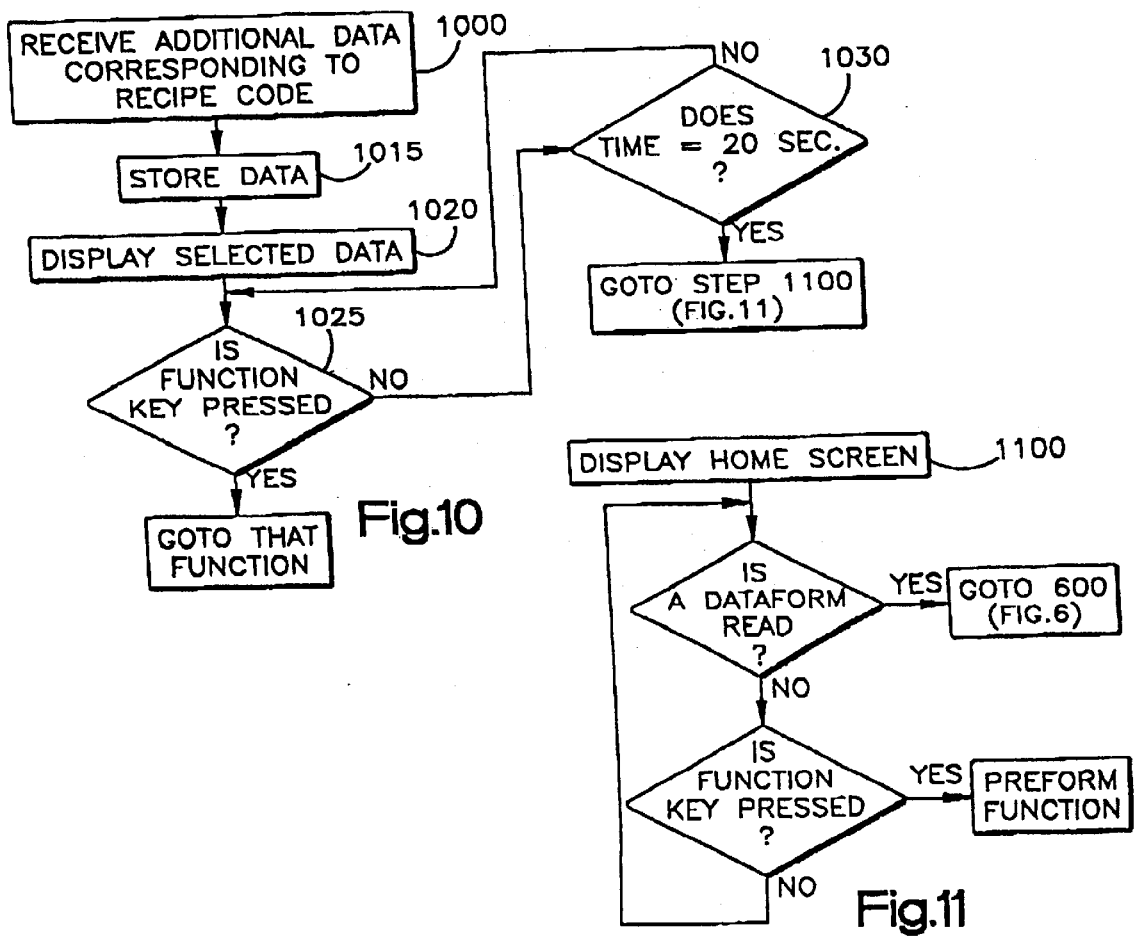

INTERACTIVE CUSTOMER INFORMATION TERMINAL

FIELD OF THE INVENTION

This invention relates to a customer information terminal including a bar code dataform reader and, more particularly, to a customer information terminal including RF capabilities for wirelessly transmitting decoded bar code dataform data to a remote device and receiving additional data related to the decoded data from the remote device.

BACKGROUND OF THE INVENTION

Various dataform readers such as optical readers and optical scanning systems have been developed for reading bar code and matrix code dataforms imprinted on an item, an item's label, or an item's package or container. Bar codes and matrix codes are types of "dataforms" which are broadly defined here to include all arrangements whereby data is encoded in some form of machine readable copy. Thus, dataforms include one and two dimensional bar codes, matrix codes and graphic codes, as well as words and numbers and other symbols, which may be printed or etched on paper, plastic, plastic cards and other items.

Dataforms are extensively used in both manufacturing, product delivery, retail sales and service industries. In retail and grocery stores, a dataform imprinted on an item or its packaging includes a stock keeping unit (SKU) identifier encoded in the dataform. Upon being read by a dataform reader, the item's SKU is decoded. The SKU may be used for accessing a price for the item from a pricing file and, if the item is purchased, the SKU is used for updating appropriate inventory and accounting records to reflect the item's removal from inventory and record the revenue generated by the item's sale.

Dataform readers come in a variety of configurations. Some dataform readers are portable, that is, are carried around by an operator to read dataforms at the location of the items such as on a shop floor, in a warehouse or in a retail store. Other dataform readers are stationary, that is, the reader is rigidly support in one location such as a store check out counter and items whose dataforms are to be read are brought to the reader. A typical dataform reader reads a dataform by emitting light directed toward the dataform to be read. Light reflected from the dataform is sensed by a light sensitive sensor of the reader. By distinguishing between different reflective values of light from contrasting light and dark portions a dataform, the dataform can be decoded. For example, a one dimensional bar code dataform typically comprises black or dark colored bar type elements printed on a white or light colored background area, with white or light colored spaces between the bar elements of the bar code. A width of each bar element determines its value. Thus, upon analyzing the intensity of a pattern of reflected light, the dataform reader is able to distinguish between the varying width of the bar elements and output an electric signal whose magnitude varies with the intensity of the pattern of reflected light. Associated decoding circuitry decodes the electric signal into digital representations of the values encoded in the read dataform.

Providing bar code dataform readers for customer use is a recent development in the retail goods industry. Some retailers have installed "self-service" pricing terminals in their stores. Each pricing code dataform reader. A customer wishing to determine the price of an item places the item's dataform in a target area of the a dataform reader. The dataform reader reads the item's dataform, decodes the item's SKU, accesses a price of the SKU from a pricing file through a host computer and displays the price of the item on a display screen of the pricing terminal for the customer.

Each such pricing terminal in a store is hardwired to a network which is supported by the host computer. When a price of a particular SKU is changed in the pricing file, the old price is overwritten by the new price. As soon as the old price is overwritten, the new price will be displayed at a pricing terminal for any item having that particular SKU. There is no need to have the price stickers affixed to each item or change price stickers on every item corresponding to a given SKU when that SKU has a price change. Moreover, if sufficient pricing terminals are provided, it is not even necessary to mark the price of items corresponding to an SKU on a shelf where the items are displayed.

Unfortunately, installing a number of pricing terminal in a large retail store requires significant effort and cost in order to physically connect the pricing terminals to the network. As a sufficient number of pricing terminals must be placed throughout the store to allow convenient consumer access, it is often times necessary to extend existing network wires to areas which typically would not require nearby network access. Further, each time a pricing terminal needs to be added, removed or moved to a new location because of changing the layout of the store or other business need, significant costs and expenses would be incurred. Also, the information available from these terminals are generally limited to pricing information and do not allow the a customer to interact with the pricing terminal to receive additional information that may be desired by the customer. Thus, customers generally find using the pricing terminals to be burdensome in relation to the benefit derived especially since most stores continue to mark prices in convenient locations such as on items or on display shelves holding items.

SUMMARY OF THE INVENTION

An interactive customer information (CI) terminal of the present invention includes a housing defining an interior region, electronic circuitry including a microprocessor supported within the housing interior region, a display screen supported by the housing, a plurality of user interface keys supported on a front face of the housing, a dataform reader module supported by the housing and a radio module disposed within the housing interior region for wireless communication with a remote device.

The dataform reader includes an illumination assembly for providing sufficient illumination of a target area and a camera assembly including an optics assembly for focusing an image of the target area onto a two dimensional array of photosensors or photodetectors. Decoding circuitry is provided to decode a dataform imaged by the camera assembly. The CI terminal further includes a printer which, in one embodiment, is integral with the terminal and in a second embodiment, a printer is hardwired to the CI terminal electronics.

In yet another embodiment of the CI terminal of the present invention, a portable hand held dataform reader is provided in addition to the dataform reader supported by the housing. The portable hand held dataform reader facilitates reading a dataform on an item which, because of its weight or size, is difficult to properly position with respect to the dataform reader supported by the housing to have its dataform read.

While the dataform reader supported by the housing is always energized to permit on demand reading of a dataform, the portable hand held dataform reader includes an actuation trigger to energize the reader. Except when the actuation trigger is depressed, the portable dataform reader is off to reduce power consumption. To reduce power consumption even further, when the actuation trigger of the portable dataform reader is depressed, blocking signals are coupled to a microprocessor controlling the CI terminal circuitry such that the microprocessor turns off the dataform reader supported by the housing during a period when the portable dataform reader is engaged in a dataform reading session.

The CI terminal includes a plurality of apertures through a back side of the housing permitting the terminal to be easily mounted on properly spaced heads of bolts or screws extending from a wall. Because the CI terminal includes a radio module for wireless communication with a remote host computer, it does not have to be hardwired to network and, therefore, the CI terminal can easily be moved from one location to another within a facility or between facilities with a minimum of effort.

The CI terminal of the present invention provides a plurality of options for a customer or user interfacing with the terminal. If an item having a dataform affixed thereto is read by the dataform reader of the CI terminal, a screen configuration will be presented to the customer which presents to the customer a price of the item, ingredients of the item, nutritional information relating to the item, a location of the item in a store and a suggested recipe for the item. The foregoing data is received from a remote host computer in response to transmitting a signal via RF wireless communication to the host computer. The signal transmitted to the host computer includes at least a portion of the decoded dataform.

A recipe book is provided near the CI terminal. The recipe book includes a plurality of recipes and associated bar code dataforms. If a bar code dataform from the recipe book is read by the dataform reader module, a signal corresponding to the decoded dataform is transmitted via the radio module to the remote host computer. In response, the host transmits data relating to the selected recipe. The microprocessor selects at least a portion of the transmitted data and causes a display screen configuration to be displayed including the selected recipe name, a list of ingredients, nutritional information relating to the recipe, the number of people served and the price and location of each ingredient in the recipe. The user may utilize the user interface keys to change a number of persons served by a particular recipe. The microprocessor responds to the increase or decrease in the desired number of persons served by the recipe by appropriately modifying the amounts and corresponding package sizes of the ingredients to serve the desired number of persons.

If a customer identification card having a dataform is read by the dataform reading module, a signal corresponding to the decoded dataform is transmitted to the remote host computer. After receiving data relating to the customer, the microprocessor causes a screen configuration to be displayed which identifies the customer, the customer's purchases over a predetermined period of time and a price associated with each item purchased.

If a coupon having a dataform is read by the dataform reader module, a signal corresponding to the decoded dataform is transmitted to the remote host computer. After receiving data relating to the item to which the coupon pertains, the microprocessor causes a screen configuration to be displayed including the name of the item relating to the coupon, a regular and a discounted price of the item, the location of the item and a suggested recipe for the item.

The aforementioned and other aspects of the present invention are described in more detail in the detailed description and accompanying drawings which follow.

BRIEF DESCRIPTION OF THE DRAWINGS

FIG. 1A is another perspective view of the CI terminal of FIG. 1;

FIG. 7B is a flow chart setting forth a process of the CI terminal of FIG. 1 for reading a plurality of bar code dataforms associated with a plurality of items;

FIG. 9 is a flow chart of the CI terminal of FIG. 1 subsequent to reading a bar code dataform associated with a customer identification card;

FIG. 10 is a flow chart of the CI terminal of FIG. 1 subsequent to reading a bar code dataform associated with a recipe;

FIG. 11 is a flow chart of the CI terminal of FIG. 1 terminating a customer use session.

DETAILED DESCRIPTION

Figure 1:
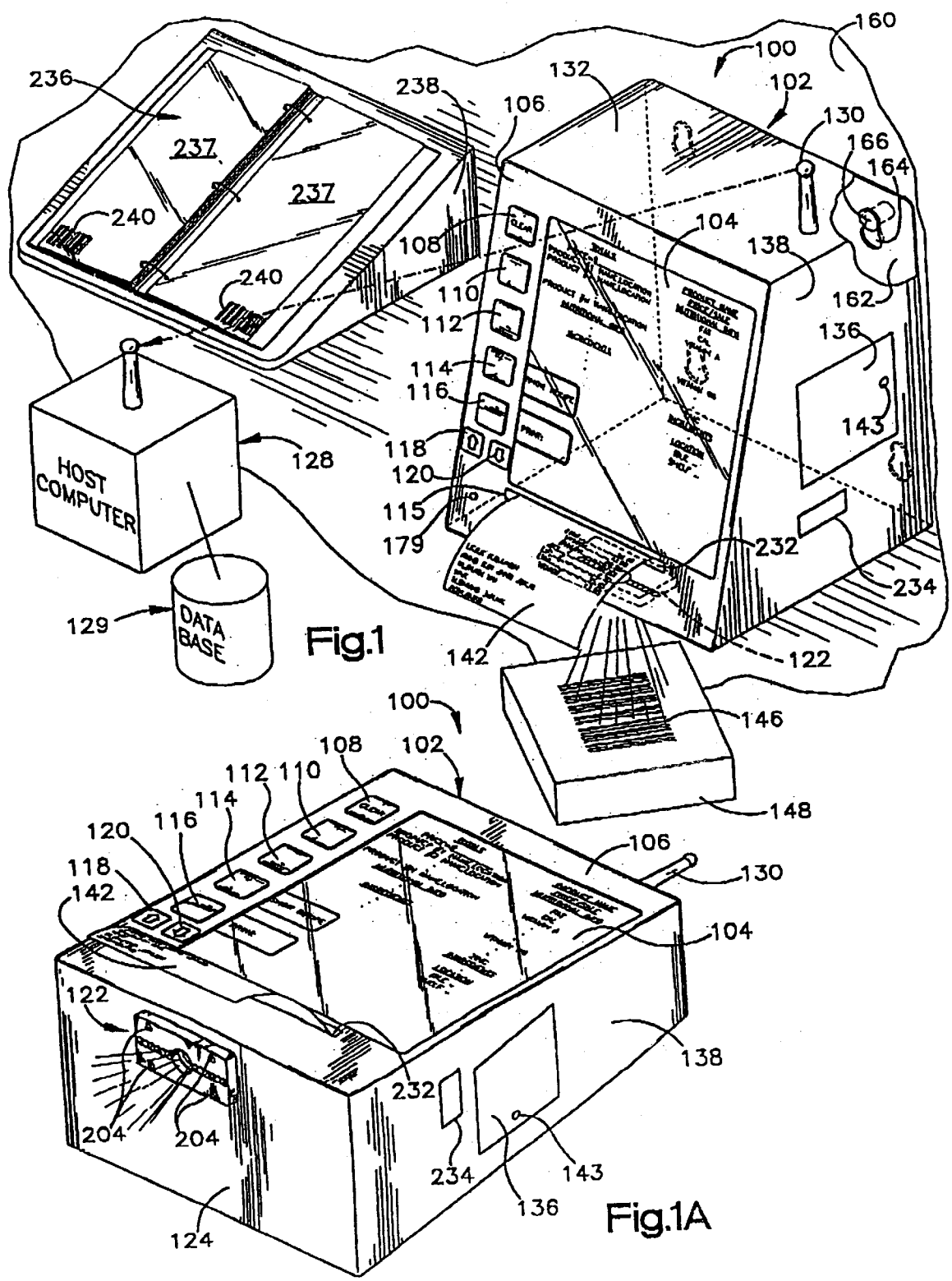
FIG. 1 is a perspective view of a customer information (CI) terminal of the present invention mounted to a wall in a store and a remote device with which the CI terminal communicates.
Figure 2:
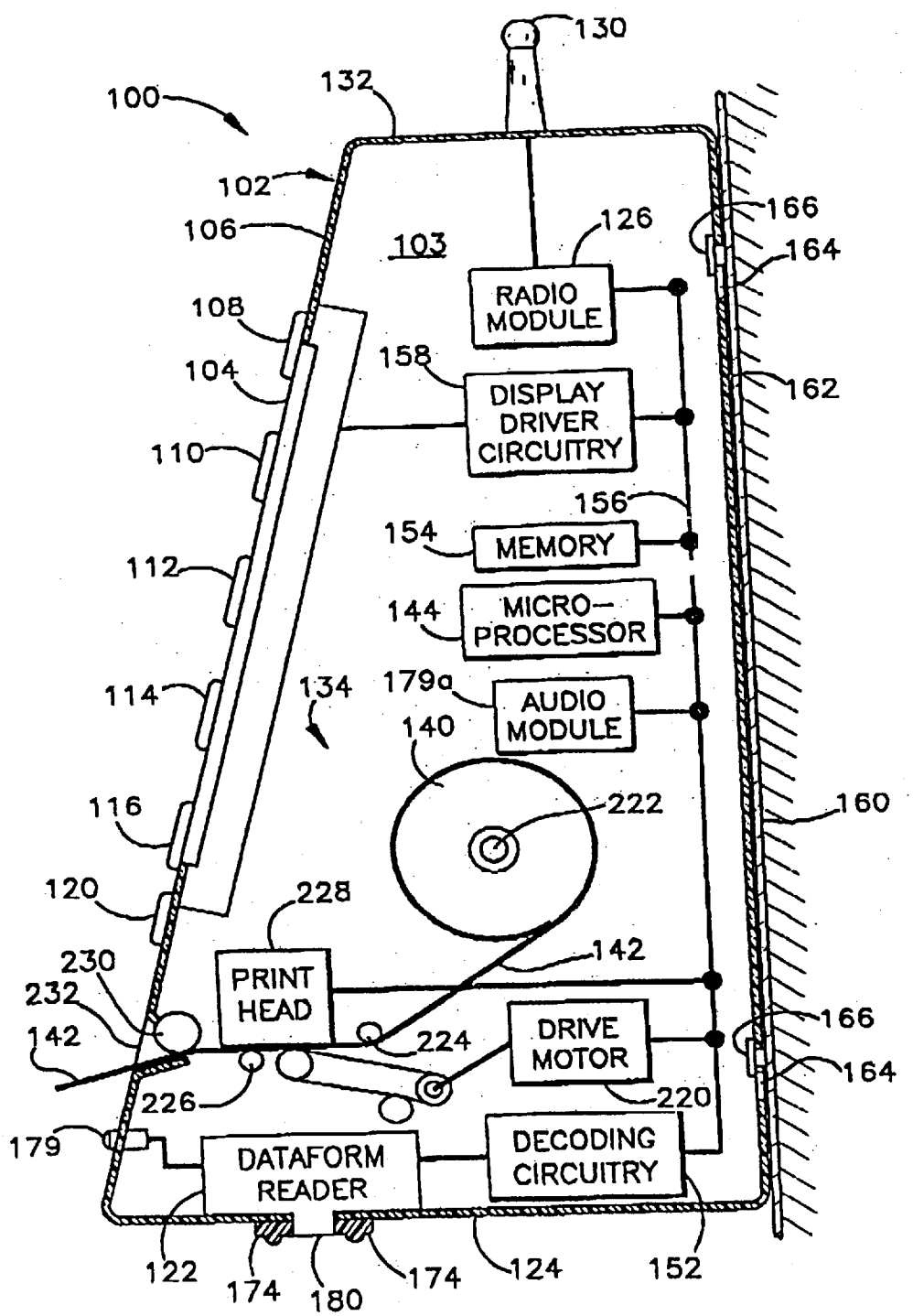
FIG. 2 is a schematic sectional view of the CI terminal of FIG. 1.
Figure 3:
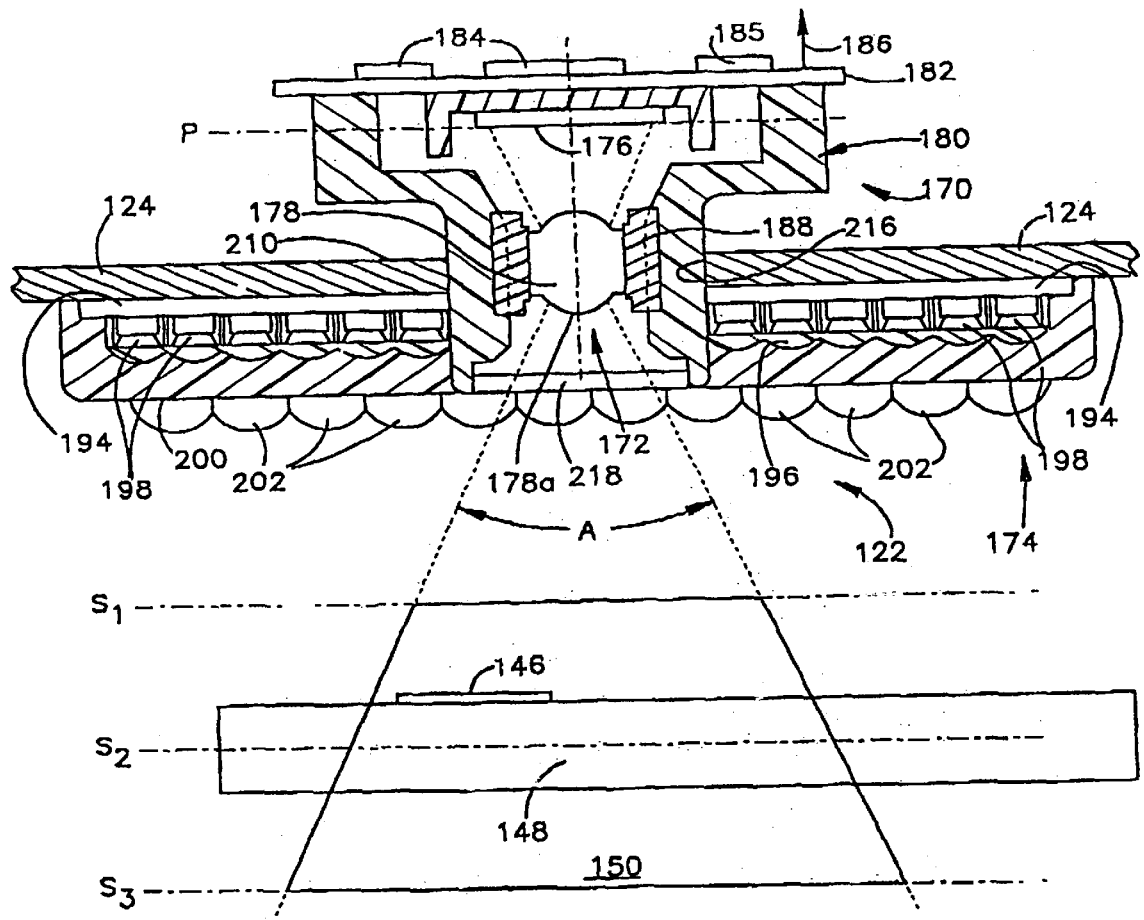
FIG. 3 is a schematic sectional view of a dataform reader module of the CI terminal of FIG. 1.

Turning to the drawings, FIGS. 1, 1A and 2 illustrate the preferred embodiment of an interactive customer information (CI) terminal of the present invention, shown generally at 100. The CI terminal 100 includes a housing 102 defining an interior region 103 (FIG. 2). The housing 102 supports components of the CI terminal 100 including a visual display screen 104 visible through an opening in a front side 106 of the housing 102. The housing 102 also supports a plurality of user interface keys 108, 110, 112, 114, 116, 118, 120 which extend through apertures in the housing front side 106. As can best be seen in FIG. 1A, a dataform reader module 122 extends through an opening in a bottom side 124 of the housing 102 near the front side 106. An enlarged sectional view of the dataform reader module 122 is shown in FIG. 3 as will be discussed below.

As can be seen schematically in FIG. 2, a radio module 126 is disposed with the housing interior region 103 for wirelessly communicating with a remote device. The radio module 126 includes an RF receiving system and an RF transmitting system and additionally includes an external antenna 130 which extends through an opening in a top side 132 of the housing 102. The remote device includes a host computer 128 and associated database 129. The host computer 128 is capable of maintaining real time communication with the CI terminal 100 through the radio module 126.

Also disposed within the housing interior region 103 is printer module 134 (FIG. 2). The housing 102 includes a maintenance door 136 (FIGS. 1 and 1A) on a side 138. The maintenance door 136 allows access to the housing interior region 103 including access to a printer paper supply roll 140 of the printer module 134. The printer paper supply roll 140 may be replaced as needed when printer paper 142 on the roll is nearly exhausted. The maintenance door 136 includes a lock 143 which limits access to the interior region of the housing 102.

As can be seen in FIG. 2, a microprocessor 144 is supported within the housing interior region 103. The microprocessor 144 controls the overall operations of the CI terminal 100. A user (not shown) of the CI terminal 100 interfaces with the microprocessor 144 through the display screen 104, the dataform reader 120 and user interface keys 108, 110, 112, 114, 116, 118, 120. Responding to commands entered by the user of the CI terminal 100, the microprocessor 144 controls various operations of the CI terminal 100 including, for example: a) reading a dataform 146 (FIGS. 1 and 3) affixed to an item 148 which the user passes through a reading zone 150 (FIG. 3) of the reader 122; b) decoding the dataform 146 utilizing decoding circuitry 152 (FIG. 2) after performing a successful read; c) displaying at least a portion of the decoded data on the display screen 104; d) retrieving additional data related to the decoded data from the remote host computer 128; e) displaying at least a portion of the retrieved additional data on the display screen 104; f) responding to requests from the user input via the user interface keys 108, 110, 112, 114, 116, 118, 120 including retrieving supplemental data from the host computer 128 relating to the decoded data or the retrieved additional data; g) responding to requests from the user input via the user interface keys 108, 110, 112, 114, 116, 118, 120 including processing/modifying decoded data and/or retrieved additional data; and h) printing selected data.

Referring to FIG. 2, microprocessor execution is controlled by programs coded in one or more IC chips comprising ROM and/or RAM memory 154. The microprocessor 144 and the memory 154 communicate with each other via an internal data and command bus 156. Also connected to the bus 156 through display driver circuitry 158 is the display screen 104. The display screen 104 is used for displaying graphical and textual information to the user and is controlled by the display driver circuitry 158 (FIG. 2). The display screen 104 of the CI terminal 100 uses a liquid crystal display (LCD) to display information in user readable format. Alternately, the display screen may comprise a touch or pressure sensitive screen wherein commands or data can be input by touching appropriate portions of the screen with a finger or an electronic stylus.

As can be seen in FIGS. 1 and 2, the CI terminal 100 is mounted flush with a vertical wall 160. A back side 162 of the housing 102 includes four inverted bulb-shaped apertures 164. The rounded lower portions of the bulb-shaped apertures 164 accept bolt heads of four bolts 166 inserted into the wall 160. The bolt heads are spaced from the wall by a distance which is just greater than a width of the housing back side 162. After the housing 102 is properly aligned and pressed against the wall 160 such that the bolt heads extend through aligned lower portions of the apertures 164, the housing is moved vertically downwardly so that the bolt heads overlie portions of the housing back side 162 adjacent respective slot-shaped upper portions of the apertures 164. Moving the housing 102 vertically downward removably secures the housing 102 to the wall 160.

If at some future time it is desired to move the CI terminal 100 to a new location, it is only necessary to provided four properly spaced bolt heads extending from a support (e.g., a wall or other solid frame, such as an angle iron) to hang the CI terminal 100 on. Thus, the CI terminal 100 of the present invention permits quick and inexpensive location changes. Because the radio module 126 permits wireless communication with the remote device 128, the necessity to stringing cable to a new location to connect the CI terminal 100 to a hardwired network is eliminated. This substantially reduces installation time and cost and allows flexibility in placement of a plurality of CI terminals 100 in a facility because each CI terminal can be placed in a desired, convenient location without regards to where network connections can be made. The radio module 126 is connected to an internal bus 156 and includes a transceiver (not shown) for transmitting and receiving data. Suitable radios for the radio module 126 include Model Nos. 095 or the 025 produced by Aironet Wireless Communications, Inc. of Akron, Ohio.

Turning to FIG. 3, the dataform reader 122 is coupled to the internal bus includes a camera assembly 170, an optics assembly 172 and an illumination module 174. The illumination module 174, when energized provides sufficient illumination of the dataform reading zone 150 such that sufficient light will be reflected from the dataform 146 in the reading zone and focused on a two dimensional (2D) photosensor array 176 of the camera assembly 170 by a lens assembly 178 of the optics assembly 172 such that a decodable image of the dataform will be produced by the 2D photosensor array 176. The 2D photosensor array 176 and a camera housing 180 are mounted to printed circuit board 182. Also mounted on the printed circuit board 182 is image control circuitry 184 and an analog to digital converter 185 for controlling the camera assembly 170 and processing a composite analog video signal from the camera assembly such that a digital signal 186 is generated and coupled to the decoding circuitry 152.

A suitable 2D photosensor array 176 is the model number CCM-M25 CCD sensor array produced by Sony Corporation. Details of a suitable dataform reader module 122 including a camera assembly and associated image control circuitry incorporating fuzzy logic control circuitry, an optics assembly and an illumination module are disclosed in U.S. application Ser. No. 08/544,018, filed Oct. 18, 1995 and entitled "Extended Working Range Dataform Reader Including Fuzzy Logic Control Circuitry". The entire contents of Ser. No. 08/544,618 are incorporated herein in its entirety by reference.

The lens assembly 178 of the optics assembly 172 produces an angular field of view A of approximately 50 degrees. The optimal dataform reading range from an outwardly facing front surface 178a of the lens assembly 178 is approximately 5.5", shown as S2 in FIG. 3. However, the dataform 146 can be read between S1 (near field cut-off distance) and S3 (far field cut-off distance) which correspond to distances of approximately 2.5" and 8.5". Thus, as can be seen in FIG. 3, the reading zone 150 is defined by the boundary of the angular field A and the lines corresponding to S1 and S3. At the far cut-off distance S3, the lens assembly 178 has an angular field of view which is wide enough to image a dataform that is 5" long by 3.75' wide. The dataform 146 must be passed through the reading zone 150 for the dataform to be read by the dataform reader module 122.

The 2D photosensor array 176 comprises a 752 by 582 array of photosensors or photodetectors (corresponding to 437,664 photosensors or image pixels). Each photosensor of the photosensor array 176 is capable of detecting and storing a charge proportional to an intensity of reflected light received during an exposure period. When the photosensors of the photosensor array 176 are read out, an electrical signal is generated which represents the intensity of the reflected light incident on each photosensor during the exposure period. The camera housing 180 (FIG. 3) shrouds ambient light from the 2D photosensor array 176 and positions a lens support member 188 of the optics assembly 172 such that the photosensor array is substantially at an image plane P of the lens assembly 178.

Figure 3A:
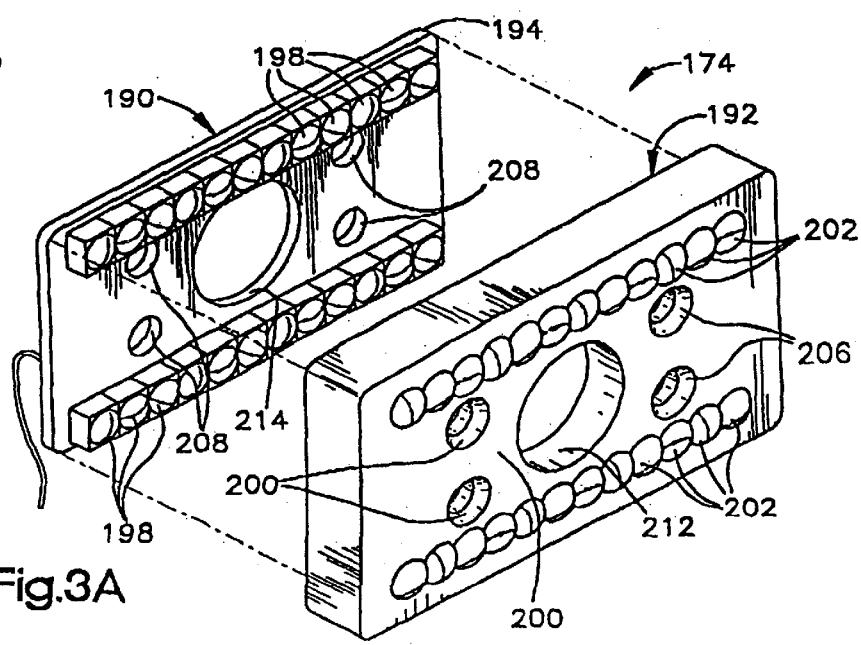
FIG. 3A is an exploded perspective view of an illumination module of the dataform reader module of FIG. 3.

The dataform reader 122 also includes the illumination module 174. Turning to FIGS. 3 and 3A, the illumination module 174 is a two part structure including a printed circuit board assembly 190 and a focusing component 192. The printed circuit board assembly 190 includes a printed circuit board 194 which is adhesively bonded into a cavity 196 (FIG. 3) in a back of the focusing component 192 with cynoacrolate, UV curing or a structural adhesive. A surface of the printed circuit board 194 supports two rows of illumination LEDs 198. Each row includes twelve illumination LEDs 198. Each of the twenty four illumination LEDs 198 provides an illuminosity of 285 mini candela (mcd) over an angular illumination field of about 68 degrees. A suitable surface mount illumination LED 198 is produced by the MarkTech Corporation of Latham, N.Y., and sold under Part No. MTSM735K-UR or MTSM745KA-UR.

A front surface 200 of the focusing component 192 forms a front of the illumination module 174 and provides protection to the printed circuit board assembly 190 from impact and environmental contaminants. The focusing component 192 includes two rows of exposure illumination lens cells 202 which are aligned with corresponding illumination LEDs 198. The exposure illumination lens cells 202 direct the 68 degree field of illumination from respective illumination LEDs 198 into a smaller uniform illumination field having an angular field of view which is substantially the same as the angular field of view A of the optics assembly 172, namely, about 50 degrees.

As can be seen in FIG. 1A, the illumination module 174 is secured to the bottom side 124 of the housing 102 by inserting four screws 204 through four holes 206 in focusing component 192 and four aligned holes 208 in the printed circuit board 194 and threading the screws in co-axially aligned holes (not shown) in the housing bottom side 124. A distal portion 210 (FIG. 3) of the camera housing 180 extends through a central opening 212 (FIG. 3A) of the illumination module focusing component 192, an aligned central opening 214 of the printed circuit board 194 and an opening 216 in the bottom side 124 of the housing 102 such that a distal end 218 of the camera housing 180 is substantially flush with the front surface 200 of the focusing component 192.

The dataform reader 122 of the CI terminal 100 is constantly in an active state in order to be capable of reading a dataform introduced into the reading zone 150 at any time and the CI terminal 100 will response with relevant information, as is discussed below.

Upon a successful read and decoding of the dataform 146 by the dataform reader 122 and the decoding circuitry 152, a green LED indicator light 179 (FIGS. 1 and 2), visible through an opening in the front side 106 of the housing 102 is energized for a predetermined period of time (about 1.5 seconds) and an audio module 179a (FIG. 2) is actuated for a predetermined period of time (about 0.5 seconds) to signal to the user of the CI terminal 100 that a successful read and decode of the dataform 146 has been completed.

A printout of user requested information is provided by the printer module 134. The printer module 134 includes a drive motor 220 which responds to signals sent from the microprocessor 144 and initiates operation of the printer module 134. The printer paper supply roll 140 is rotatably supported on an axle 222. Printer paper 142 from the printer paper supply roll 140 is wound under a first guide roller 224 and feed between a platen 226 and a printhead 228. The first guide roller 224 and platen 226 ensure the printer paper 142 is properly positioned under the printhead 228. The printhead 228 is also connected to the internal buss 156 where it receives signals from the microprocessor 144 regarding what information is to be printed. Finally, the printer paper 142 passes under a second guide roller 230 prior to becoming accessible to a customer through an slotted opening 232 the front side 106 of the housing 102.

Additionally, as seen in FIGS. 1 and 1A, the CI terminal 100 may also have an I/O port through a connector 234, such as a RS-232 connector, through which peripheral devices could be connected to the CI terminal. Examples of such peripheral devices which might advantageously be coupled to the CI terminal 100 include a backup printer (not shown) or second display screen monitor (not shown), could readily be connected.

A book 236 including a plurality of removable pages 237 is supported on an angled support 238 affixed to the wall 160 near the CI terminal 100. Each page 237 of the book 236 includes one or more pictures and a short description of a recipe. Each recipe has an associated bar code dataform 240 imprinted on its respective page 237. To obtain a complete recipe and other information describe below, a user of the CI terminal 100 removes a page of interest and positions the dataform of the page below the dataform reader so that the dataform may be read and decoded.

Figure 4:
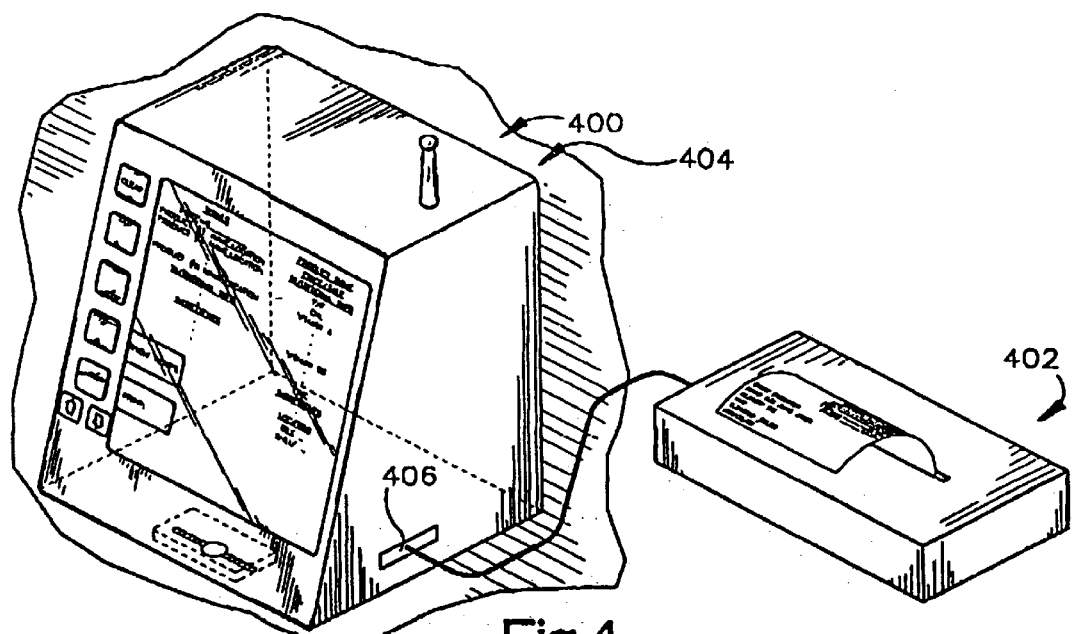
FIG. 4 is an alternate embodiment of the CI terminal of the present invention with an external printer.

As shown in FIG. 4, in another embodiment of the present invention, a CI terminal 400 may include a printer module 402 which is external to the CI terminal housing 404. Thus, in this embodiment, the printer module 402 connects to the CI terminal 400 via a serial RS-232 connector 406.

Figure 5:
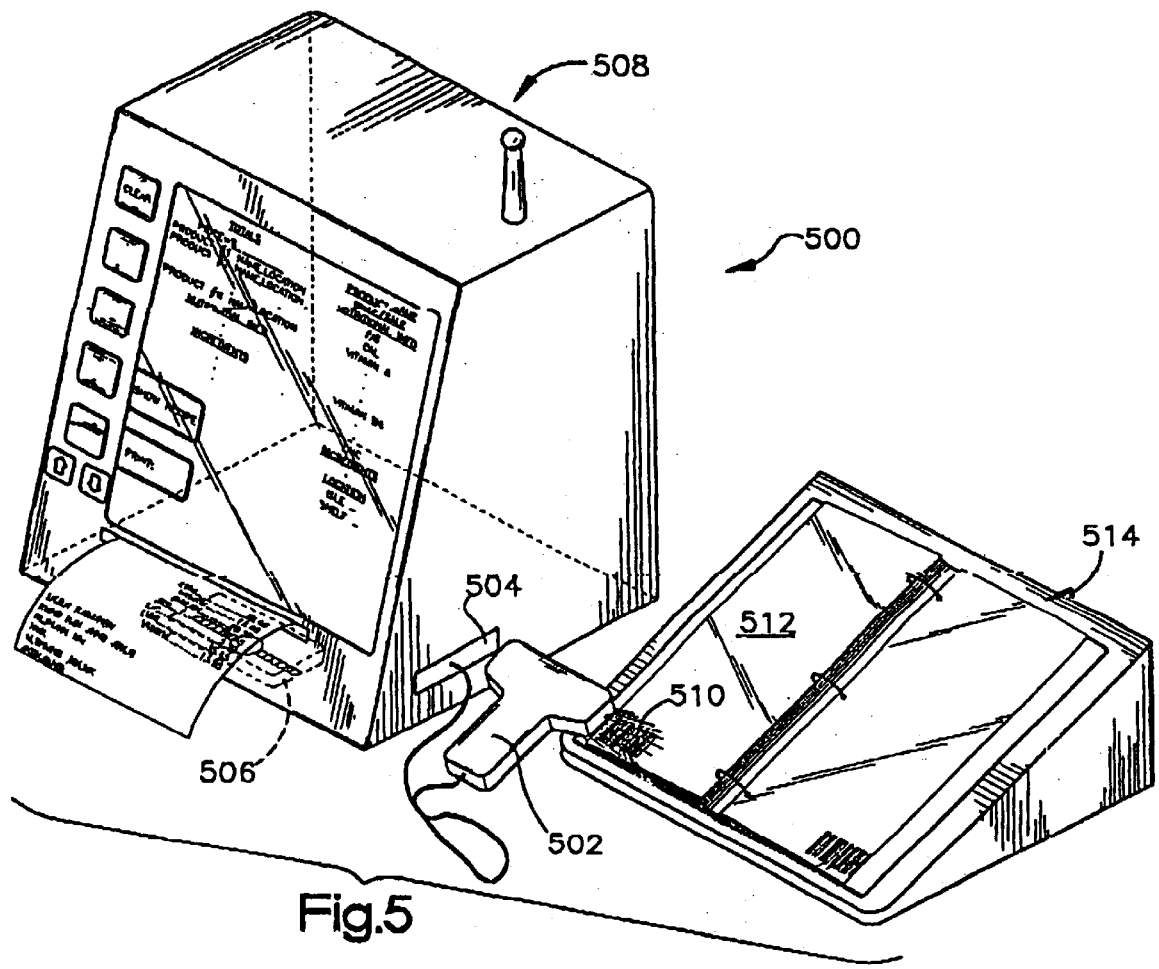
FIG. 5 is a perspective view of an alternate embodiment of a CI terminal of the present invention including a portable hand held dataform reader.

As shown in FIG. 5, in another embodiment of the present invention, a CI terminal 500 may include a portable hand held bar code dataform reader 502 which connects to the CI terminal 500 via a serial RS-232 connector 504. The portable hand held dataform reader 502 is provided in addition to the dataform reader 506 supported by a housing 508. The portable hand held dataform reader 502 facilitates reading a dataform on an item (not shown) which, because of its weight or size, is difficult to properly position with respect to the housing dataform reader 506 to have its dataform read. In addition, the portable hand held dataform reader 506 facilitates reading a dataform 510 on a page 512 of a recipe book 514 supported near the CI terminal 500 without the necessity of removing the page 512 from the book.

While the housing dataform reader 506 is always energized to permit on demand reading of a dataform, the portable hand held dataform reader 502 includes an actuation trigger (not shown) to energize the reader. Except when the actuation trigger is depressed, the portable dataform reader 502 is off to reduce power consumption. To reduce power consumption even further, when the actuation trigger of the portable dataform reader 502 is depressed, blocking signals are coupled to a microprocessor (not shown) controlling the CI terminal 500 such that the microprocessor turns off the housing dataform reader 506 during a period when the portable dataform reader 502 is engaged in a dataform reading session.

The operation and user interface features of the CI terminal of the present invention will be described below with respect to the CI terminal embodiment set forth in FIGS. 1, 1A, and 2. However, it should be understood that the following description also applies to the CI terminal embodiments set forth in FIGS. 4 and 5.

In operation, the CI terminal 100 of the present invention is capable of a variety of functions which the user can control via the user interface keys 108, 110, 112, 114, 116, 118, 120. Additionally, dataforms associated with objects such as coupons, products, customer ID cards and recipes can be read to activate additional functions. For example, as shown in FIG. 1, in order to initiate a dataform reading session a user must position the bar code dataform 146 such that it passes through the dataform reading zone 150 (FIG. 3) thereby allowing the dataform reader 122 to properly capture an image for decoding the dataform 146. Upon passing the dataform 146 through the reading zone 150, light from the illumination module 174 illuminates the dataform 146 so that reflected light can pass through the optics assembly 172 and be captured by the 2D photosensor array 176.

During an exposure period, charge accumulates on each photosensor, the magnitude of the accumulated charge dependent on the intensity of the reflected light incident on the photosensor. Upon reading out the photosensor array 176 after the exposure period, an electric signal is produced whose magnitude varies reflecting the accumulated charge on each photosensor as the photosensors are read out sequentially. The electrical signal is then coupled to the decoding circuitry 152 where the signal is decoded and converted to digital format. The digital signal representing the decoded dataform is coupled to the internal bus 156 and directed to the microprocessor 144.

Figure 6:
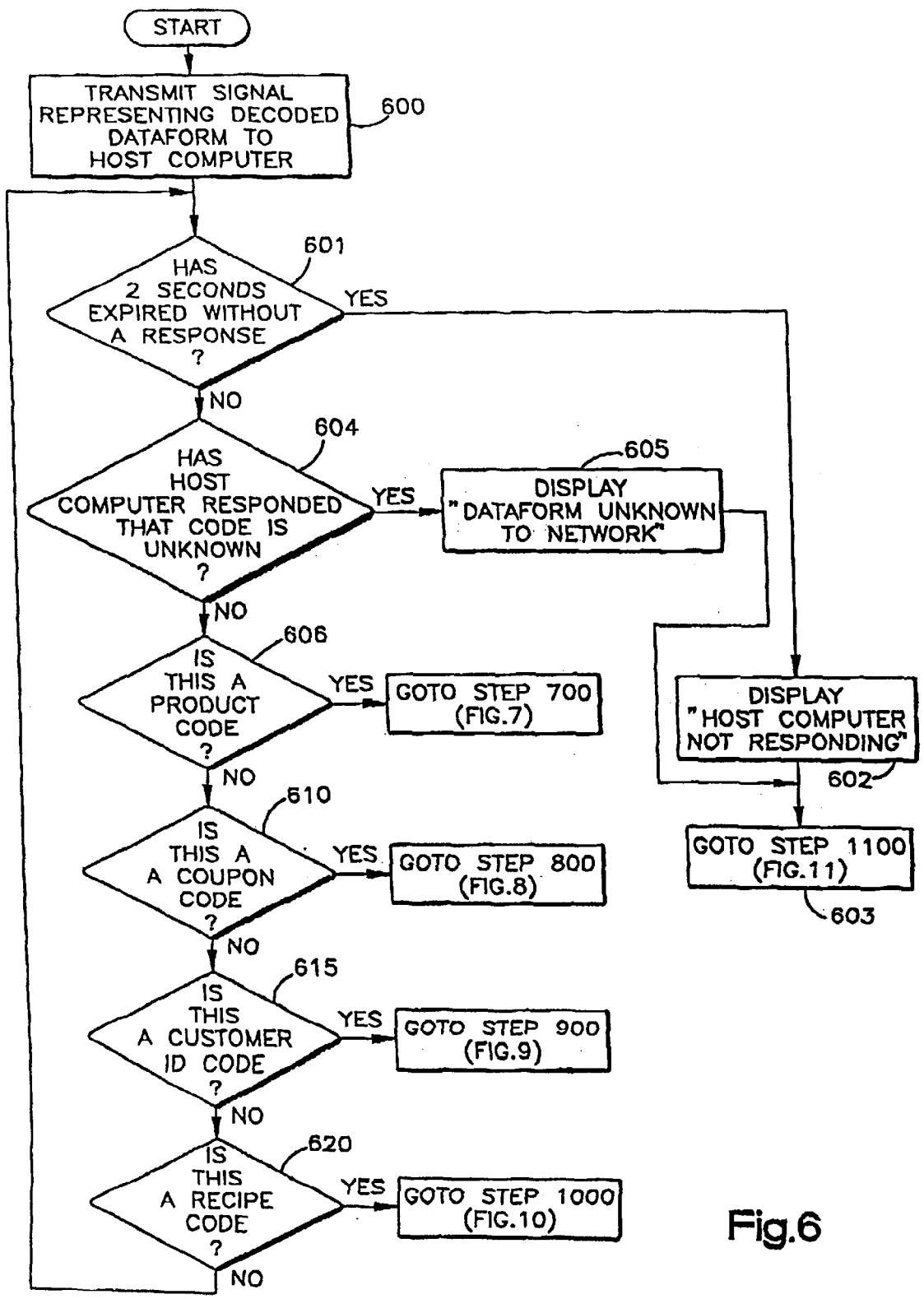
FIG. 6 is a flow chart setting forth a process of the CI terminal of FIG. 1 subsequent to reading a bar code dataform.

After receiving the decoded digital signal representative of the decoded dataform, the microprocessor 144 stores this decoded dataform data in the memory 154 and processes the information according to the flow chart shown in FIG. 6. As shown in FIG. 6, at step 600, upon receiving a signal representative of a decoded dataform, the microprocessor 144, utilizing the radio module 126, transmits a signal corresponding to the decoded dataform to the host computer 128 which receives the signal utilizing a radio module having an RF receiving system and an RF transmitting system. At step 601, the microprocessor 144 determines whether two seconds has elapsed since the decoded dataform signal was transmitted to the host computer 128 without a response from the host computer. If more than two seconds have elapsed without a response from the host computer 128, at step 602, the microprocessor 144 sends a signal to the display driver circuitry 158 causing the display screen 104 to display a message indicating to the user that "host computer is not responding". The message is displayed for a predetermined period of time, for example, five seconds. Then, at step 603, the microprocessor 144 goes to step 1100 (FIG. 11).

If two seconds have not elapsed since the decoded dataform signal was transmitted to the host computer 128, then at step 604, the microprocessor 144 determines if the host computer 128 has responded to the decoded dataform signal with a message that the decoded dataform does not correspond to any known codes stored in the database 129. If the host computer 128 has responded with such a message, then the microprocessor 144 at step 605 sends a signal to the display driver circuitry 158 causing the display screen 104 to display a message indicating to the user that "dataform is unknown to network". The message is displayed for five seconds. Then, the microprocessor 144 goes to step 1100 (FIG. 11) as explained above.

Figure 7:
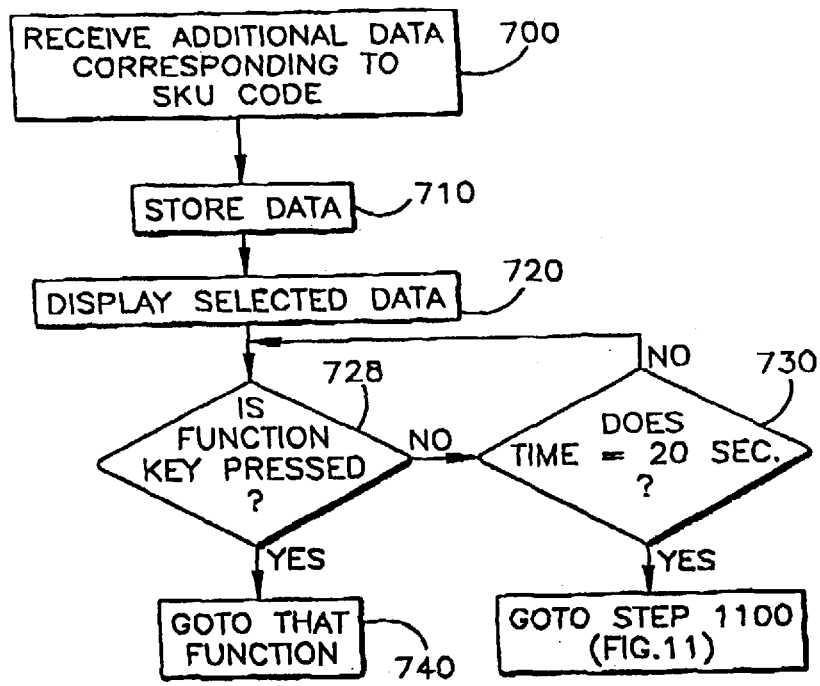
FIG. 7 is a flow chart setting forth a process of the CI terminal of FIG. 1 subsequent to reading a bar code dataform associated with an item.
Figure 8:
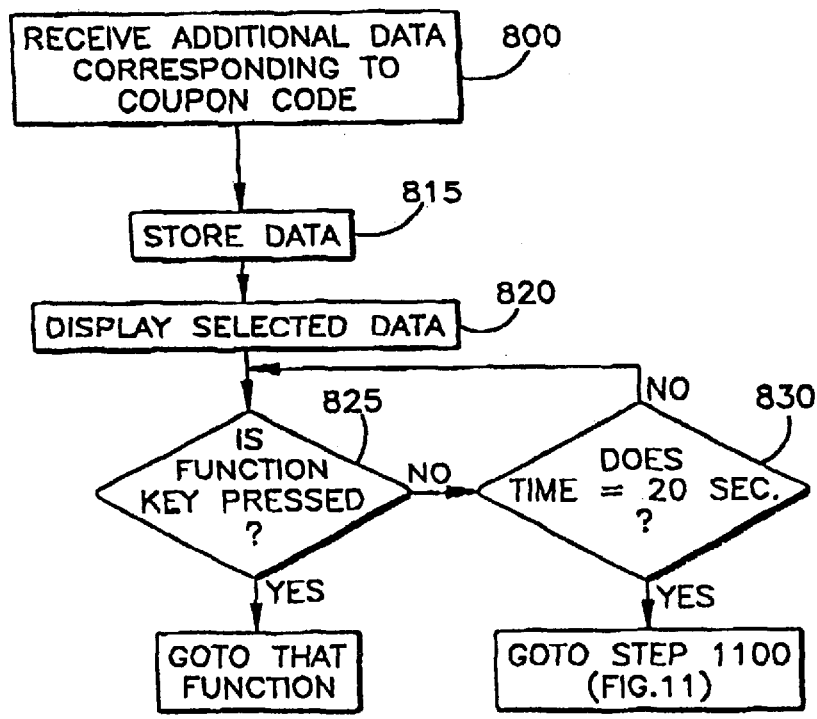
FIG. 8 is a flow chart setting forth a process of the CI terminal of FIG. 1 subsequent to reading a bar code dataforms associated with a coupon.

If the host computer 128 has not responded to the decoded dataform signal with a message that the decoded dataform does not correspond to any known codes stored in the database 129 then, at step 606, the microprocessor 144, utilizing the host computer 128, compares the decoded dataform with a lookup table in the database 129 and determines whether the decoded dataform corresponds to a known SKU code. If the decoded signal is found to be corresponding to a known SKU code, the microprocessor 144 goes to step 700 (FIG. 7). If not, the microprocessor 144 continues to step 610 where, utilizing the host computer 128, it compares the decoded dataform with known coupon codes stored in a lookup table in the database 129. If a match is found, the microprocessor 144 continues to step 800 (FIG. 8). If not, the microprocessor 144 goes to step 615 where the decoded dataform is compared to known customer identification numbers (customer ID codes) stored in the database 129.

If the decoded dataform is found to correspond to known customer ID codes, the microprocessor 144 goes to step 900 (FIG. 9), otherwise the microprocessor continues to step 620. At step 620, the microprocessor 144 compares the decoded signal with stored codes in a lookup table corresponding to known recipe codes. If the decoded dataform corresponds to a known recipe code then the microprocessor 144 continues to step 1000 (FIG. 10). If not, the process loops back to step 601.

Figure 7A:
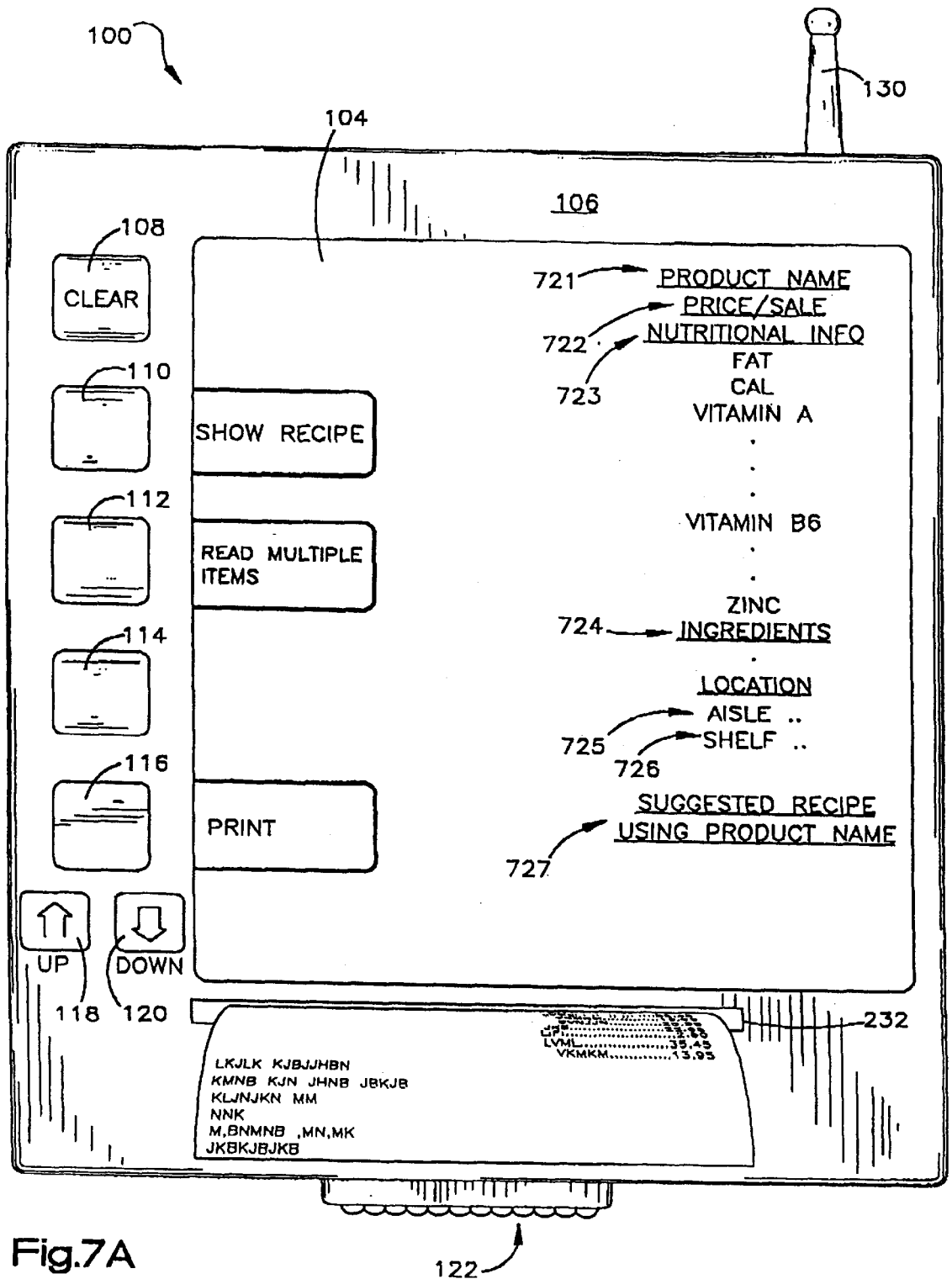
FIG. 7A is a representation of a screen layout of a visual display screen of the CI terminal of FIG. 1 associated with reading of the bar code dataform of an item.

Turning to FIG. 7, if the decoded dataform signal transmitted to the host computer 128 corresponds to a known SKU code, the host computer, at step 700, transmits data stored in the database 129 corresponding to the SKU code to the radio module 126. For purposes of this invention, the data transmitted by the host computer 128 in response to a decoded dataform signal being transmitted from the radio module 126 to the host computer is defined as "additional data". At step 700, the additional data is received by the receiver system of the radio module 126 and, at step 710, then stored in the memory 154. At step 720, the microprocessor 144 selects and sends at least a portion of the additional data and decoded data to the display driver circuitry 158 causing the selected data to be displayed in a format as shown in FIG. 7A. As shown in FIG. 7A, the selected data received and displayed contains an item or product name 721 corresponding to the SKU code, pricing information for the item 722, nutritional information 723, ingredients 724, an aisle 725 and a shelf location 726 of where the item can be found in the store and a suggested recipe using the item 727.

Figure 10A:
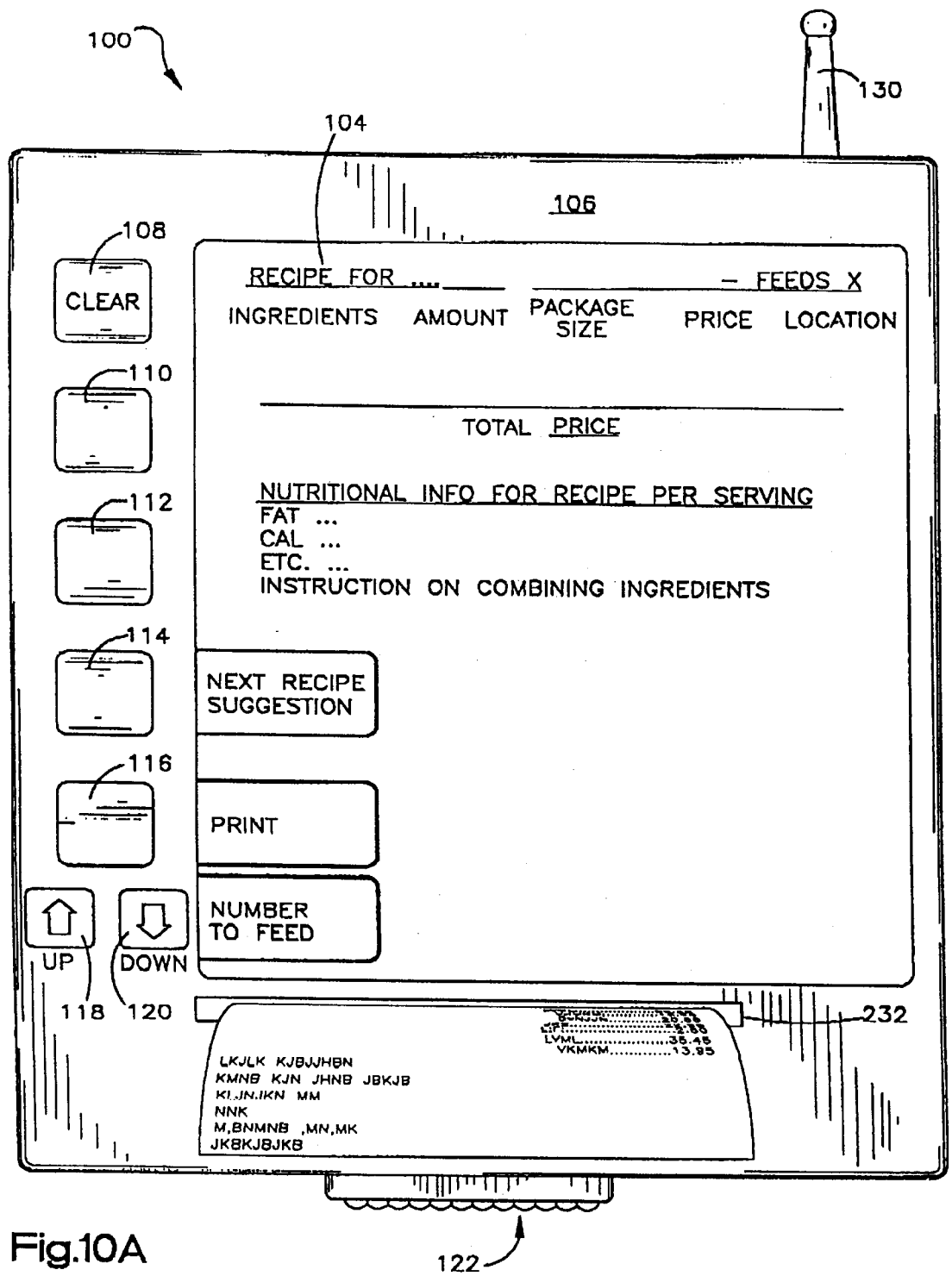
FIG. 10A is a representation of a screen layout of the visual display screen of the CI terminal of FIG. 1 associated with reading a bar code dataform of a recipe.

Returning to FIG. 7, after displaying the selected data, the microprocessor 144 at step 728 determines if any of the user interface keys 108, 110, 112, 114, 116, 118 were pressed by the user. As shown in FIG. 7A, the user interface keys 108, 110, 112, 114, 115, 118 for this screen allow a user to select one of the following options: 1) clear the display screen 104 (key 108); 2) show a recipe using the item (key 110); 3) read multiple items and keep track of all totals (key 112); 4) print information (key 116); and 5) up and down arrow keys (keys 118 and 120 respectively). If the show recipe user interface key 110 is pressed, the microprocessor 144 utilizing the radio module 126 will send a signal to the host computer 128 to retrieve data relating the suggested recipe displayed on the display screen 104. For purposes of this invention, the data transmitted by the host computer 128 in response to a signal being transmitted from the radio module 126 to the host computer resulting from a user interface key being pressed is defined as "supplemental data". At least a portion of the supplemental data retrieved from the host computer 128 relating to the suggested recipe 727 is display as seen in FIG. 10A, which will be discussed below.

If a user interface key 108, 110, 112, 114, 116, 118, 120 is not pressed, then the microprocessor 144 proceeds to step 730 where it determines whether twenty seconds have expired since the selected data was displayed. If not, the microprocessor 144 goes back to step 728 and checks whether any user interface key 108, 110, 112, 114, 116, 118, 120 has been pressed. If a user interface key has been pressed, then at 740 the microprocessor 144 goes to the appropriate step corresponding to the function chosen. If twenty seconds have elapsed since the selected data was displayed without a user interface key 108, 110, 112, 114, 116, 118, 120 being pressed, the microprocessor 144 goes to step 1100 (FIG. 11).

If at step 728, the clear user interface key 108 is pressed, the microprocessor 144 will send a signal to the display driver circuitry 158 to clear the display screen 104 and then proceed to step 1100 (FIG. 11). If the "show recipe" user interface key 110 is pressed, then the microprocessor 144 will go to step 1000 (FIG. 10). If, however, the "scan multiple items" user interface key 112 is depressed, then the microprocessor 144 will go to step 750 (FIG. 7B). If the "print" user interface key 116 is depressed once, then a summary information table is printed.

In order to print the information, the microprocessor 144 sends a signal to the printer module drive motor 220 to begin forwarding the printer paper 142. Simultaneously, the microprocessor 144 also sends the printhead 228 digital signals representative of information which is to be printed on the printer paper 142. The summary information table includes the name, price, location and total bill for all items whose dataform were read since the last time the microprocessor 144 was manually or internally cleared. If the "print" user interface key 116 is pressed twice within a period of time, approximately equal to or less then 1.5 seconds, then the microprocessor 144 will have the printer module printhead 228 print only information currently displayed on the display screen 104.

Referring to FIG. 7B, if the "scan multiple items" user interface key 112 is depressed, then the microprocessor 144, at step 750, checks to see if another valid dataform read has occurred. If time has expired, then the microprocessor 144 continues to step 1100 (FIG. 11). If time has not expired, then the microprocessor 144 returns to step 750 and rechecks to determine if a dataform has been read. If a valid read is obtained, then the microprocessor 144 moves to step 760 where it transmits this information to the host computer 128 via the radio module 126, and in step 765 awaits a response from the host computer 128. If a response is not obtained in two seconds, then at step 770 the microprocessor 144 sends a signal to the display driver circuitry 158 causing the display screen 104 to display the message "host computer not responding".

Figure 7C:
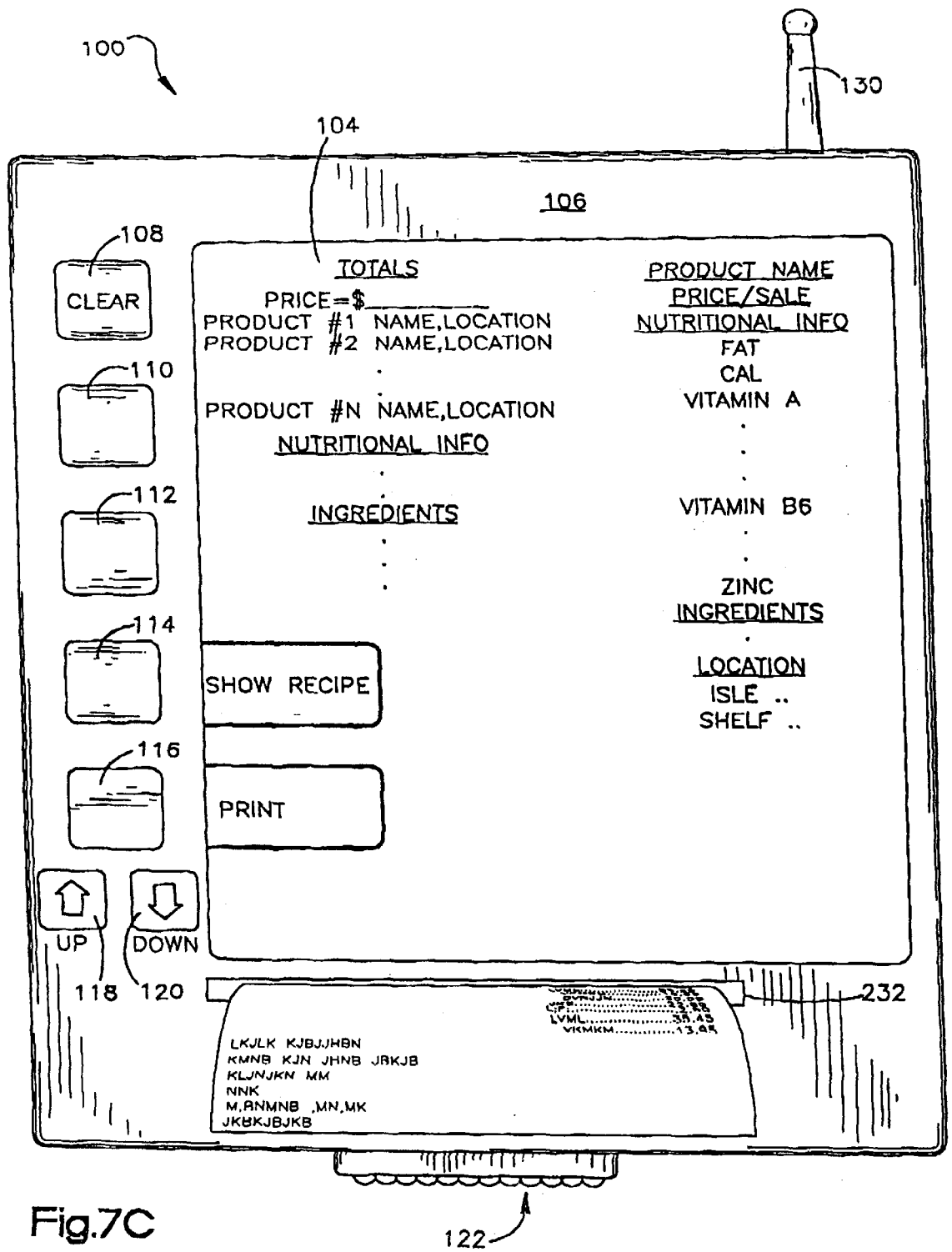
FIG. 7C is a representation of a screen layout of the visual display screen of the CI terminal of FIG. 1 associated with reading bar code dataforms of a plurality of items.

However, in order to retain any relevant information that may already be displayed on the display screen 104, the microprocessor 144 goes to step 775 and continues to display information as though the last item's dataform was never read. If, however, at step 765 a response is received from the host computer 128, then at step 775, the additional data relating to the decoded dataform received from the host computer is stored in the memory 154. At step 780, the microprocessor 144 selects at least a portion of the additional data and decoded data from the read dataform and displays the selected data on the display screen 104 as shown in FIG. 7C. Further, all totals are updated to account for the most recent dataform read.

Following the display update, the microprocessor 144 continues to step 785 where it determines if another item's dataform has been read. If so, the microprocessor 144 continues back up to step 760. If not, the microprocessor 144 at step 790 determines whether any of the currently active user interface keys are pressed. As shown in FIG. 7C, the active functions for this screen include: 1) clear (key 108); 2) show recipe using most currently scanned item (key 114); 3) print (key 116); and 4) show previous/next screen (if available) (keys 118, 120). Each of these functions operates identically to that describe above with reference to FIG. 7A. At step 797, if one of the user interface keys 108, 110, 112, 114, 116, 118, 120 is pressed, the microprocessor 144 executes a process corresponding to the selected function. If no user interface key 108, 110, 112, 114, 116, 118, 120 is pressed, the microprocessor 144 continues to step 795 where it determines if 20 seconds has expired. If a user interface key 118, 110, 112, 114, 116, 118, 120 is pressed, then the microprocessor 144 begins to perform the function in a manner identical to that described above with reference to FIG. 7A.

Referring to FIG. 8, if the decoded dataform signal transmitted to the host computer 128 corresponds to a known coupon code, the host computer, at step 800, transmits additional data relating to the decoded coupon dataform which is received by the radio module 126. The received additional data, at step 815, is stored in the memory 154. At step 820, the microprocessor 144 selects at least a portion of the additional data corresponding to the decoded coupon dataform and sends a signal to the display driver circuitry 158 causing the display screen 104 to display the selected data as shown in FIG. 8A.

Figure 8A:
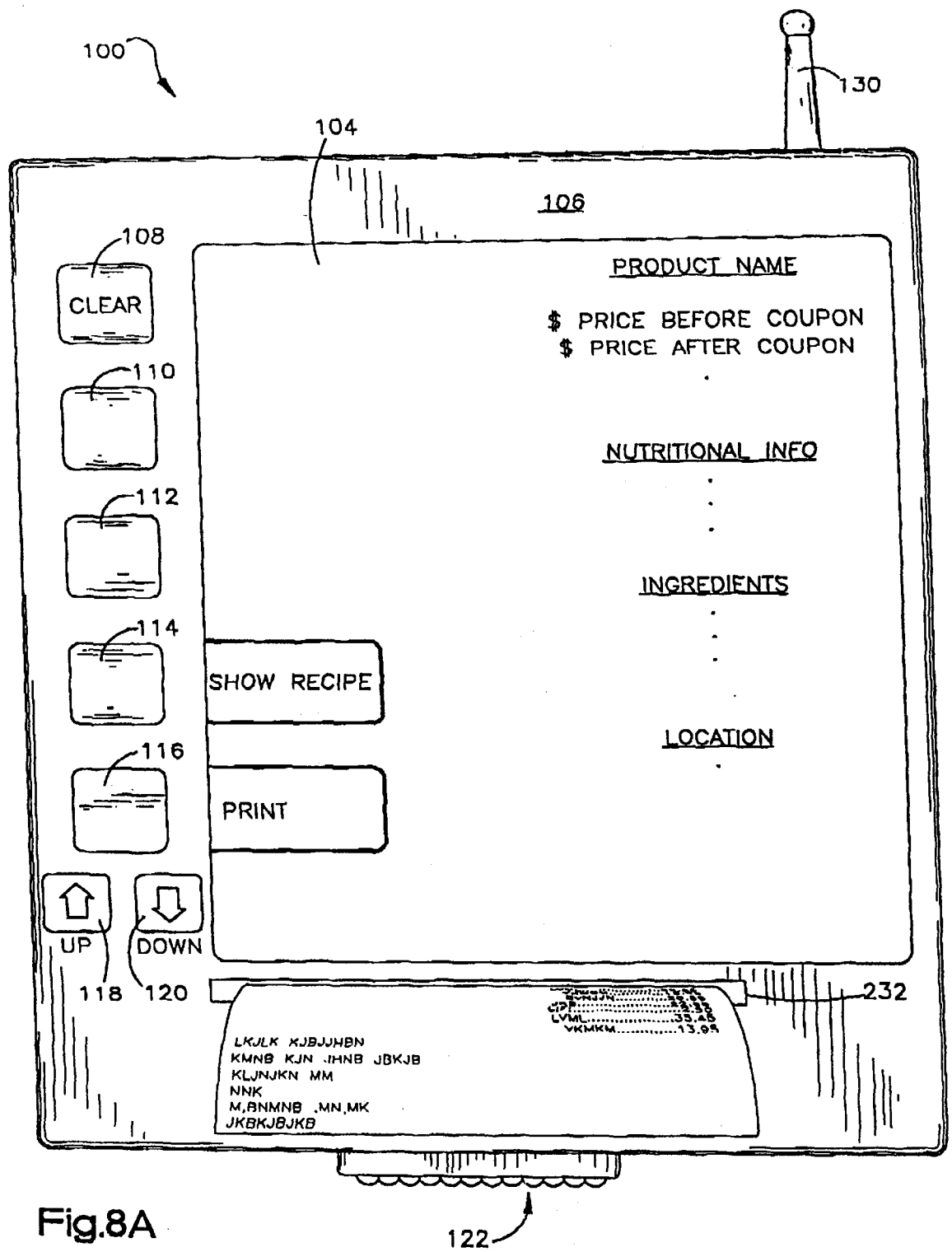
FIG. 8A is a representation of a screen layout of the visual display screen of the CI terminal of FIG. 1 associated with reading a bar code dataform of a coupon.

As shown in FIG. 8A, the data received and displayed contains a name of an item or product corresponding to the coupon's decoded dataform, pricing information before and after the coupon discount, nutritional information, ingredients, and an aisle and shelf location of where the item can be found in the store. The user interface keys 108, 110, 112, 114, 116, 118, 120 function identically to that described above with reference to FIG. 7A, although the available functions are more limited as shown in FIG. 8A. At step 825, the microprocessor 144 determines if a user interface key has been pressed by the user. If so, the microprocessor 144 executes a process corresponding to the selected function. If not, at step 830, the microprocessor 144 determines whether twenty seconds has expired. If so, the microprocessor 144 determines that the user has not responded quickly enough and goes to step 1100 (FIG. 11). If not, at step 830, the microprocessor 144 returns to step 825 to see if a user interface key has been pressed.

As indicated with reference to FIG. 6, the present invention contemplates providing each customer/user with a personal customer ID card. The personal ID card for a customer would include a unique dataform associated with that customer. Customer information would be stored in the database 129 including data regarding purchases made by the customer within the last month. As customers often buy the same items each time they go shopping, the customer using the CI terminal 106 can retrieve purchase history information as a current purchasing list or as a reminder of purchases recently made. In order for the host computer 128 to be able to store purchase history information in the database 129, the customer must have his/her ID card read at a check-out counter in conjunction with each purchase.

Figure 9A:
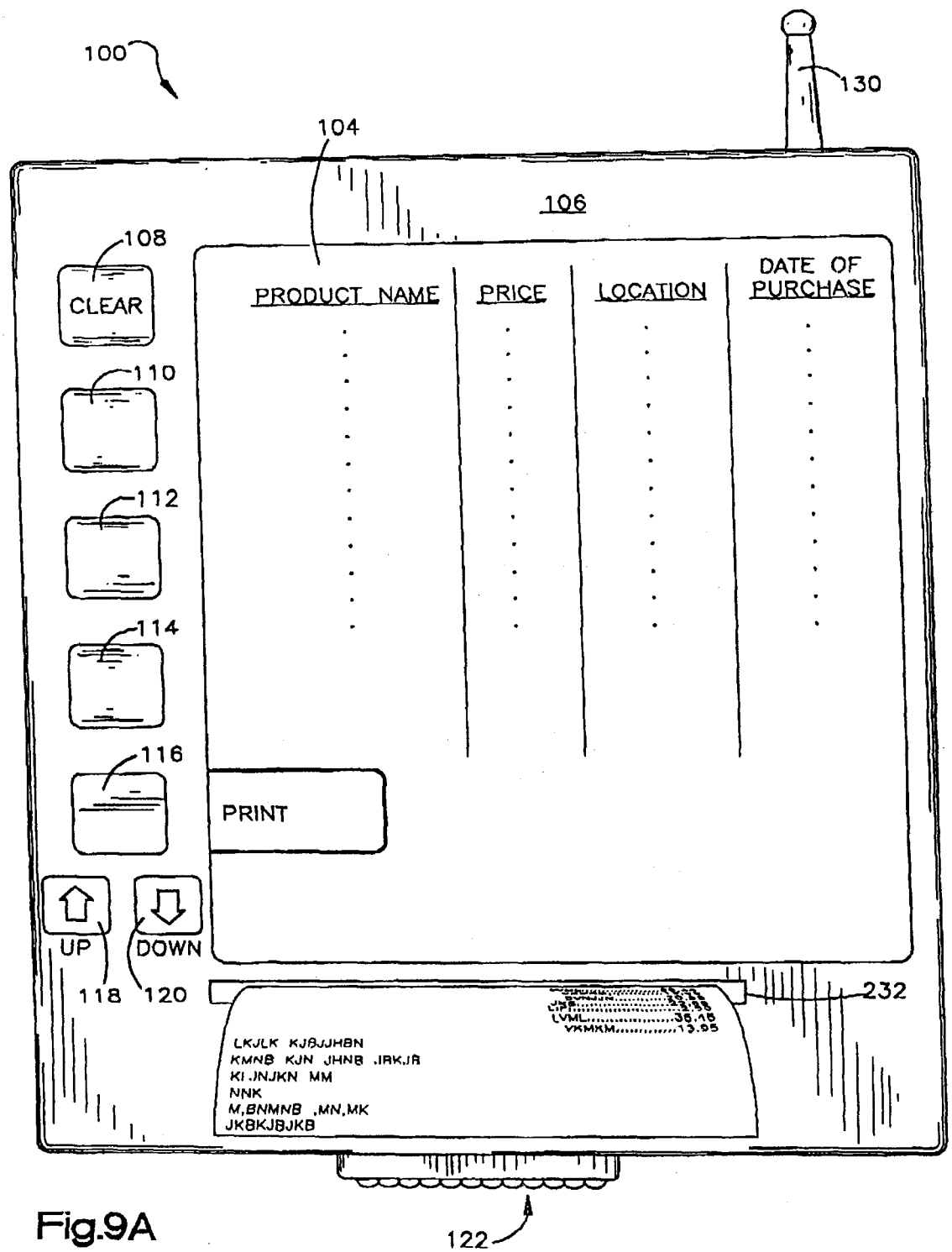
FIG. 9A is a representation of a screen layout of the visual display screen of the CI terminal of FIG. 1 associated with reading a bar code dataform of a customer identification card.

Turning to FIG. 9, if the decoded dataform signal transmitted to the host computer 128 corresponds to a known customer ID code, the host computer transmits additional data relating to the decoded customer ID dataform which is received by the radio module at step 900. The received additional data is initially stored in the memory 154. At step 920, the microprocessor selects data sent to the display where it is displayed in a format as shown in FIG. 9A. As shown in FIG. 9A, the selected data includes information regarding each item purchased over a 30 day period. More specifically, each item purchased is listed along with pricing information, location of the item in the store, and date purchased. The user interface keys 108, 110, 112, 114, 116, 118, 120 function identically to that described above with reference to FIG. 7A, although the available functions are more limited as shown in FIG. 9A.

The CI terminal 100 also provides features related to different food recipes. As described below, the features include: 1) supplying a list of ingredients necessary for preparing the recipe and the amount of ingredients that should be added; 2) identifying the location of each item necessary; 3) allowing the user to enter the number of people they wish to serve and have the CI terminal 100 respond by indicating the amount of each item that would be needed; 4) providing total bill and nutritional information related to the recipe; and 5) explaining how to prepare the food with these ingredients. The recipes can be obtained in one of two ways. One method would be for the user to remove a desired recipe on a page 237 of the recipe book 236 (FIG. 1) and read the associated dataform 240 with CI terminal 100. Each page 237 of the recipe book includes a picture of a prepared food and a short description. Thus, customers can flip through the pages 237 and, if desired, they can obtain further information regarding the recipe by reading the associated dataform. A second way recipe information would be obtained would be through the user interface keys 108, 110, 112, 114, 116, 118, 120 as shown in FIG. 7A and 8A.

Turning to FIG. 10, if a user interface key requesting recipe information is pressed or if a recipe bar code dataform from a page 237 of the recipe book 236 is read by the dataform reader module 122, the host computer 128 responds by transmitting additional data or supplemental data relating to the requested recipe or the decode bar code dataform. The additional or supplemental data is received by the radio module 126 at step 1000. At step 1015, the additional or supplemental data is stored in the memory 154. At step 1020, at least a portion of the additional or supplemental data related to the recipe is selected by the microprocessor 144 and a signal is sent to the display driver circuitry 158 cause the display screen 104 to display the selected data as shown in FIG. 10A.

As shown in FIG. 10A, the data received and displayed contains information regarding the name of the recipe, the number of people it feeds, each ingredient, an amount of each ingredient required for the recipe, for each ingredient, a price of a package of a size which will contain a sufficient amount of that ingredient to satisfy the amount requirement for that ingredient and a location in the store of each package, and total price for the packages of all ingredients listed and nutritional information for the recipe per serving. The user interface keys 108, 110, 112, 114, 116, 118, 120 allow a user to: 1) clear the screen (key 108); 2) advance to a new recipe suggestion (if available) (key 114); 3) print the current screen (key 116); and 4) increase or decrease the number of people fed (keys 118, 120).

In order to change the number of people fed, the user may push the up or down arrow 118, 120 user interface keys. In response to changing the number of people feed, the microprocessor 144 modifies the amount of each ingredient needed for the recipe proportionally. This processed data is then displayed on the display screen 104. For purposes of this invention, additional data or supplemental data which is modified or further processed by the microprocessor 144 in response to a user command is defined as "processed data". Further, if the amount of an ingredient needed requires a larger package size for the ingredient or an additional package of the ingredient, the larger package size or number of packages required is updated on the display screen 104 and the price corresponding to the larger package size or number of packages required is also updated on the display screen. The displayed updated information represents processed data resulting from further processing by the microprocessor 144 of at least a portion of the additional data or supplemental data such as the amount of an ingredient, the package size required and its associated price.

The next recipe user interface key 114 is active only in situations where; a) an item's SKU dataform was read and the user pressed the show recipe user interface key 110 (FIG. 7A) or 114 (FIG. 7C), or b) a coupon's dataform was read and the user pressed the show recipe user interface key 114 (FIG. 8A). In either of these situations, the microprocessor 144 will send a signal to the host computer 128 via the radio module 126, requesting an additional recipe stored in the database 129 relating to the item or product whose SKU dataform was read or item featured in the coupon.

Figure 11A:
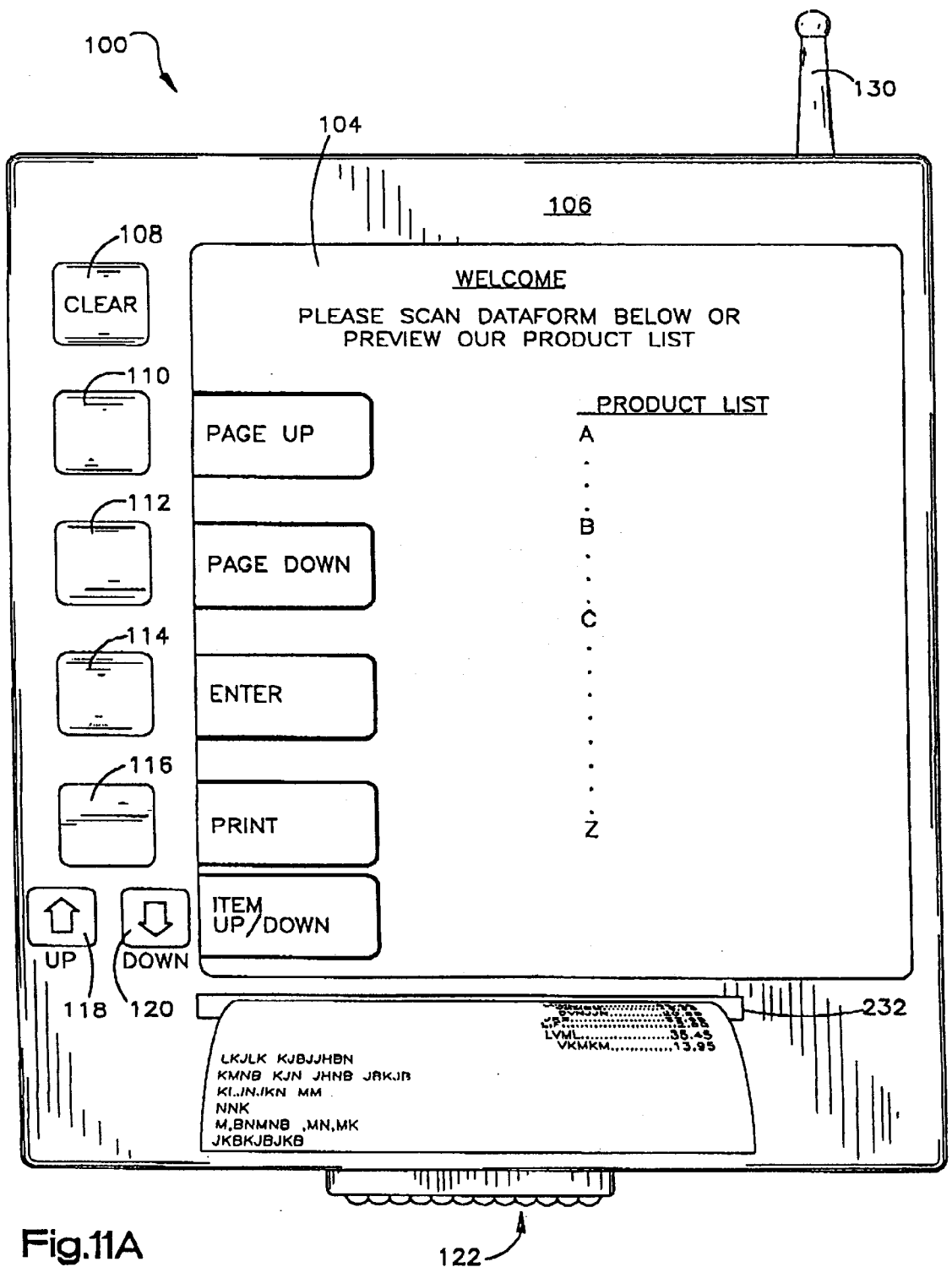
FIG. 11A is a representation of a screen layout of the visual display screen of the CI terminal of FIG. 1 associated with termination of a customer use session.

Referring to FIG. 11, if the CI terminal 100 is either manually cleared by pressing the "clear" user interface key 108, or cleared by the microprocessor 144 returning to the home screen (FIG. 11A), then the microprocessor 144 goes to step 1100. At step 1100, the microprocessor 144 sends a signal to the display driver circuitry 158 causing the display screen 104 to display the home screen as set forth in FIG. 11A. The home screen asks the user to either read a dataform or use the up/down arrow keys 118, 120 to scroll up or down a list of all items or products sold in the store. If the user reads an item's dataform the microprocessor 144 goes to step 600 (FIG. 6). If the user is scrolling through available items, then upon highlighting an item using the up/down arrow keys 118, 120, he/she may push the enter key and obtain further information concerning the highlighted item. If the enter key is pressed, then the microprocessor 144 goes to step 700 where it attempts to gain further additional data regarding the item from the host computer 128. Further, the user has a print screen capability by depressing the print user interface key 116.

While the description has described the currently preferred embodiments of the invention, those skilled in the art will recognize that other modifications may be made without departing from the invention and it is intended to claim all modifications and variations as fall within the scope of the invention.

In compliance with the statute, the invention has been described in language more or less specific as to structural and methodical features. It is to be understood, however, that the invention is not limited to the specific features shown and described, since the means herein disclose comprise preferred forms of putting the invention into effect. The invention is, therefore, claimed in any of its forms or modifications within the proper scope of the appended claims appropriately interpreted in accordance with the doctrine of equivalents.

We claim:

1. An interactive customer information terminal comprising:
    a) a housing defining an interior region;
    b) electronic circuitry including a microprocessor supported within the housing interior region;
    c) a display screen supported by the housing and electrically coupled to the electronic circuitry;
    d) a dataform reader module supported by the housing and electrically coupled to the electronic circuitry for reading a dataform passed through a reading zone of the module, the dataform having encoded data relating to the product;
    e) decoding circuitry supported by the housing and electrically coupled to the electronic circuitry for decoding the dataform read by the dataform reader module and generating decoded data corresponding to the dataform;
    f) a radio module supported by the housing and including a transmitter system and a receiver system electrically coupled to the electronic circuitry for carrying out wireless communications with a remote device, the radio module being configured to carry out a first communication with the remote device by transmitting at least a portion of the decoded data to the remote device and receiving from the remote device additional data related to the decoded data, at least a portion of the additional data being displayed on the display screen; and
    g) a user interface module supported by the housing providing a user interface for inputting a command by a customer of the retail grocery store wherein the command inputted prompts the radio module to carry out a second communication with the remote device subsequent to the first communication to obtain supplemental data from the remote device, the supplemental data relating to at least one of the decoded data and the additional data and wherein at least a portion of the supplemental data is displayed on the display screen.

2. The customer information terminal of claim 1 wherein the decoded data corresponds to a SKU code of the product and the additional data includes data corresponding to the decoded data in at least one of the following categories; name of the product, price of the product, nutritional information for the product, and ingredients of the product.

3. The customer information terminal of claim 1 wherein the user interface module includes a plurality of user interface keys supported by the housing.

4. The customer information terminal of claim 1 wherein the dataform reader includes a two dimensional photosensor array.

5. The customer information terminal of claim 1 additionally including a printer module coupled to the electrical circuitry for printing at least a portion of data displayed on the display screen.

6. An interactive customer information terminal for use in a retail grocery store comprising:
    a) a housing defining an interior region;
    b) electronic circuitry including a microprocessor supported within the housing interior region;
    c) a display screen supported by the housing and electrically coupled to the electronic circuitry;
    d) a dataform reader module supported by the housing and electrically coupled to the electronic circuitry for reading a dataform of a coupon of a product in the retail grocery store, the dataform being passed through a reading zone of the module, the dataform having encoded data relating to the coupon;
    e) decoding circuitry supported by the housing and electrically coupled to the electronic circuitry for decoding the dataform read by the dataform reader module and generating decoded data corresponding to the dataform;
    f) a radio module supported by the housing and including a transmitter system and a receiver system electrically coupled to the electronic circuitry for carrying out wireless communications with a remote device, the radio module being configured to carry out a first communication with the remote device by transmitting at least a portion of the decoded data to the remote device and receiving from the remote device additional data related to the decoded data, at least a portion of the additional data and a portion of the decoded data being displayed on the display screen; and
    g) a user interface module supported by the housing providing a user interface for inputting a command by a customer of the retail grocery store wherein the command inputted prompts the radio module to carry out a second communication with the remote device subsequent to the first communication to obtain supplemental data relating to the product from the remote device and wherein at least a portion of the supplemental data is displayed on the display screen.

7. The customer information terminal of claim 6 wherein the decoded data corresponds to a coupon code and the additional data includes data corresponding to the decoded dataform in at least one of the following categories; name of the product, price of the product before coupon discount, price of the product after coupon discount, ingredients of the product, and location of the product in the store.

8. The customer information terminal of claim 6 wherein the user interface module includes a plurality of user interface keys supported by the housing.

9. The customer information terminal of claim 6 wherein the dataform reader includes a two dimensional photosensor array.

10. The customer information terminal of claim 6 additionally including a printer module coupled to the electrical circuitry for printing at least a portion of data displayed on the display screen.

11. An interactive customer information terminal for use in a retail grocery store comprising:
    a) a housing defining an interior region;
    b) electronic circuitry including a microprocessor supported within the housing interior region;

c) a display screen supported by the housing and electrically coupled to the electronic circuitry;

d) a dataform reader module supported by the housing and electrically coupled to the electronic circuitry for reading a dataform of a customer identification card for a customer of the retail grocery store, the dataform being passed through a reading zone of the module, the dataform having encoded data relating to the customer identification card;

e) decoding circuitry supported by the housing and electrically coupled to the electronic circuitry for decoding the dataform read by the dataform reader module and generating decoded data corresponding to the dataform;

f) a radio module supported by the housing and including a transmitter system and a receiver system electrically coupled to the electronic circuitry for carrying out wireless communications with a remote device, the radio module being configured to carry out a first communication with the remote device by transmitting at least a portion of the decoded data to the remote device and receiving from the remote device additional data related to the customer and purchases of the customer at the retail grocery store, at least a portion of the additional data being displayed on the display screen; and g) a user interface module supported by the housing providing a user interface for inputting a command by a customer of the retail grocery wherein the command inputted prompts the radio module to carry out a second communication with the remote device subsequent to the first communication to obtain supplemental data relating to the customer from the remote device and wherein at least a portion of the supplemental data is displayed on the display screen.

12. The customer information terminal of claim 11 wherein the decoded data corresponds to a customer identification code and the additional data includes data corresponding to the decoded data in at least one of the following cagetories; items purchased by the customer in a predetermined period of time, price of each item purchased in the predetermined period of time, a location of each item purchased in the predetermined period of time, and a date of purchase of each item purchased in the predetermined period of time.

13. The customer information terminal of claim 11 wherein the user interface module includes a plurality of user interface keys supported by the housing.

14. The customer information terminal of claim 11 wherein the dataform reader includes a two dimensional photosensor array.

15. The customer information terminal of claim 11 additionally including a printer module coupled to the electrical circuitry for printing at least a portion of data displayed on the display screen.

16. An interactive customer information terminal for use in a retail grocery store comprising:

a) a housing defining an interior region;

b) electronic circuitry including a microprocessor supported within the housing interior region;

c) a display screen supported by the housing and electrically coupled to the electronic circuitry;

d) a dataform reader module supported by the housing and electrically coupled to the electronic circuitry for reading a dataform of a recipe having as ingredients one or more products sold by the retail grocery store, the dataform being passed through a reading zone of the module, the dataform having encoded data relating to the recipe;

e) decoding circuitry supported by the housing and electrically coupled to the electronic circuitry for decoding the dataform read by the dataform reader module and generating decoded data corresponding to the dataform;

f) a radio module supported by the housing and including a transmitter system and a receiver system electrically coupled to the electronic circuitry for carrying out wireless communications with a remote device, the radio module being configured to carry out a first communication with the remote device by transmitting at least a portion of the decoded data to the remote device and receiving from the remote device additional data related to the recipe, at least a portion of the additional data being displayed on the display screen; and g) a user interface module supported by the housing providing a user interface for inputting a command by a customer wherein the command inputted prompts the radio module to carry out a second communication with the remote device subsequent to the first communication to obtain supplemental data relating to the recipe from the remote device and wherein at least a portion of the supplemental data is displayed on the display screen.

17. The customer information terminal of claim 16 wherein the decoded data corresponds to a recipe code and the additional data includes data corresponding to the decoded data in at least one of the following categories: recipe name, ingredients of the recipe, number of persons served by the recipe, package size needed for each ingredient, location of each ingredient in the store and nutritional information for the recipe.

18. The customer information terminal of claim 16 wherein the user interface module includes a plurality of user interface keys supported by the housing.

19. The customer information terminal of claim 16 wherein the dataform reader includes a two dimensional photosensor array.

20. The customer information terminal of claim 16 additionally including a printer module coupled to the electrical circuitry for printing at least a portion of data displayed on the display screen.

21. The customer information terminal of claim 17 wherein a user may utilize the user interface module to selectively modify the number of persons served by the recipe and the microprocessor will further process at least a portion of the additional data to appropriately change an amount of each ingredient to have the recipe serve the number of persons selected by the user and display the changed amounts of each ingredient on the display screen.

22. A method of providing customer information utilizing an interactive customer information terminal in a retail grocery store and a host computer and associated database, the steps of the method comprising:

a) reading a dataform passed through a reading zone of a dataform reader module supported by the customer information terminal, the dataform having encoded data relating to at least one of the following; an item offered for sale in the retail grocery store, a coupon for an item offered for sale in the retail grocery store, a customer identification number of a customer of the retail grocery store, and a recipe utilizing one or more items offered for sale in the retail grocery store;

b) decoding the dataform read by the dataform reader module of the customer information terminal thereby generating decoded data;

c) transmitting in a first communication at least a portion of the decoded data to the host computer utilizing a radio module supported by the customer information terminal and receiving from the host computer additional data relating to the decoded data;

d) displaying at least a portion of the additional data on a visual display screen of the customer information terminal;

e) providing a user interface module supported by the customer information terminal, the user interface module including a plurality of functions, namely, functions for further processing of the additional data and the decoded data and functions for retrieving supplemental data relating to the additional data from the host computer;

f) selecting one of the functions of the user interface module;

g) utilizing the radio module to obtain supplemental data from the host computer via a second communication with the host computer subsequent to the first communication in response to selecting one of the functions of the user interface module for retrieving supplemental data; and h) displaying as least a portion of the supplemental data on the visual display screen of the customer information terminal.

* * * * *